(12) United States Patent
Tanaka et al.

(10) Patent No.: US 6,831,777 B2
(45) Date of Patent: Dec. 14, 2004

(54) OPTICAL TRANSMISSION SYSTEM AND METHOD

(75) Inventors: Toshiki Tanaka, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/939,700

(22) Filed: Aug. 28, 2001

(65) Prior Publication Data

US 2002/0105716 A1 Aug. 8, 2002

(30) Foreign Application Priority Data

Feb. 7, 2001 (JP) ........................................ 2001-030836

(51) Int. Cl.$^7$ ................................................ H01S 3/00
(52) U.S. Cl. .................... 359/341.2; 359/334
(58) Field of Search .................. 359/341.2, 341.32, 359/334, 341.4, 154, 177, 110

(56) References Cited

U.S. PATENT DOCUMENTS

| | | | | |
|---|---|---|---|---|
| 5,241,414 A | * | 8/1993 | Giles et al. ............. | 359/341.33 |
| 6,052,219 A | * | 4/2000 | Kidorf et al. ............. | 359/334 |
| 6,052,394 A | * | 4/2000 | Lee et al. ................. | 372/6 |
| 6,344,922 B1 | * | 2/2002 | Grubb et al. ............. | 359/334 |
| 6,356,383 B1 | * | 3/2002 | Cornwell et al. .......... | 359/334 |
| 6,433,921 B1 | * | 8/2002 | Wu et al. .................. | 359/334 |
| 6,433,922 B1 | * | 8/2002 | Ghera et al. .............. | 359/334 |
| 6,452,715 B1 | * | 9/2002 | Friedrich ................... | 359/334 |
| 2001/0050802 A1 | * | 12/2001 | Namiki et al. .......... | 359/337.11 |
| 2002/0075560 A1 | * | 6/2002 | Foursa ...................... | 359/334 |
| 2002/0093729 A1 | * | 7/2002 | Gerish et al. ............. | 359/334 |
| 2002/0145796 A1 | * | 10/2002 | Kikuchi et al. ........... | 359/334 |

FOREIGN PATENT DOCUMENTS

| | | |
|---|---|---|
| EP | 1 018 666 | 7/2000 |
| EP | 1 022 870 | 7/2000 |
| JP | A-09-197452 | 7/1997 |
| JP | A-10-73852 | 3/1998 |
| JP | A-10-294510 | 11/1998 |
| JP | A-11-224967 | 7/1999 |
| JP | A-11-212044 | 8/1999 |

OTHER PUBLICATIONS

Shingo, Kawai et al., "Wide–Bandwidth and Long–Distance WDM Transmission Using Highly Gain–Flattened Hybrid Amplifier", IEEE Photonics Technology Letters, vol. 11, No. 7, 1999, pp. 886–888.

* cited by examiner

*Primary Examiner*—Mark Hellner
(74) *Attorney, Agent, or Firm*—Staas & Halsey LLP

(57) ABSTRACT

A plurality of Raman amplifiers are positioned on a transmission line over which a multi-wavelength light is transmitted. Each of the Raman amplifiers uses a plurality of pump lights $\lambda 1$ through $\lambda 4$. When a fault occurs in a pump light source producing the pump light $\lambda 3$ in a particular Raman amplifier among the plurality of Raman amplifiers, the power of the pump light $\lambda 3$ is raised in another or other Raman amplifiers.

7 Claims, 28 Drawing Sheets

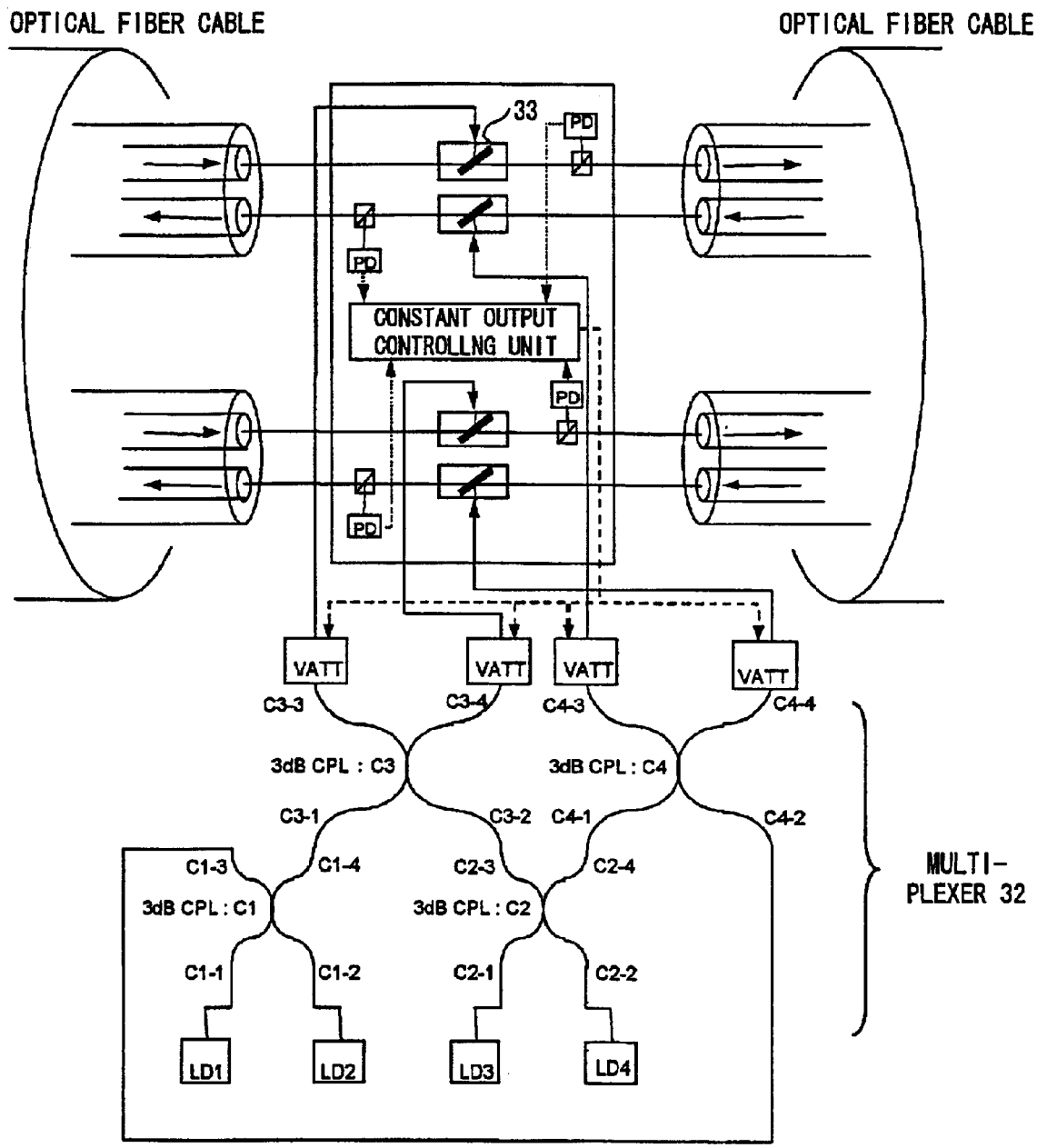
F I G. 1 3

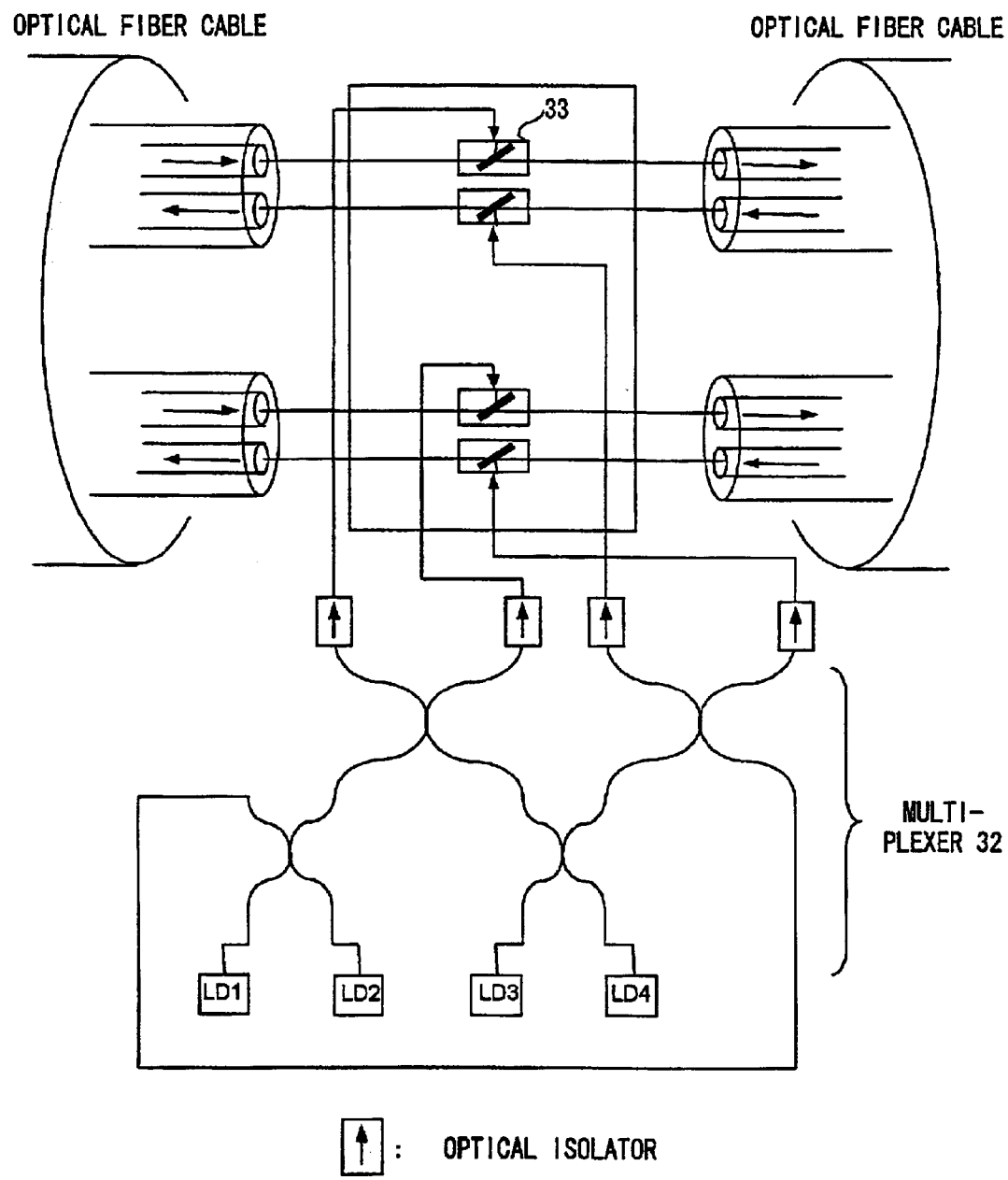
F I G. 14

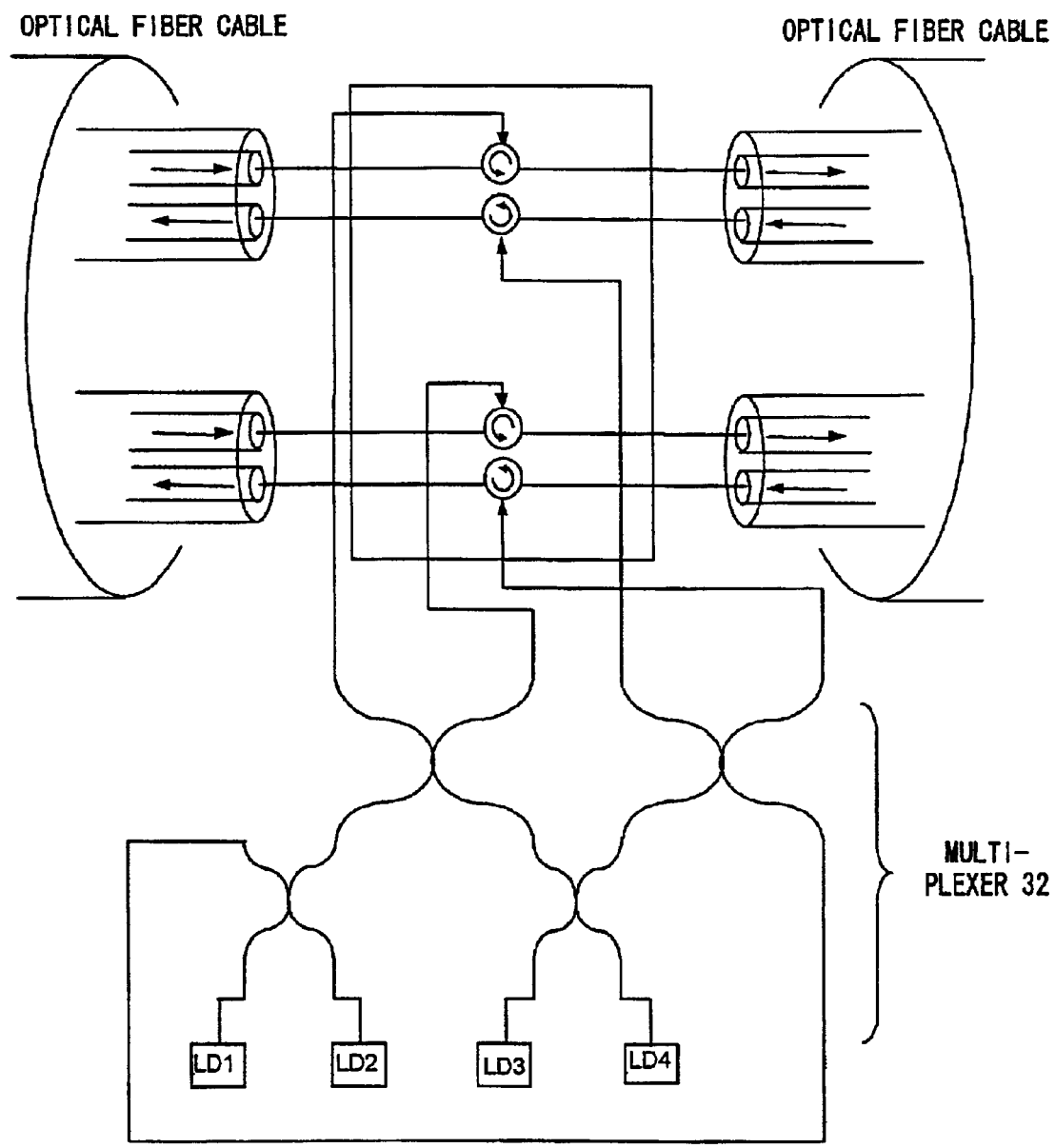
F I G. 16

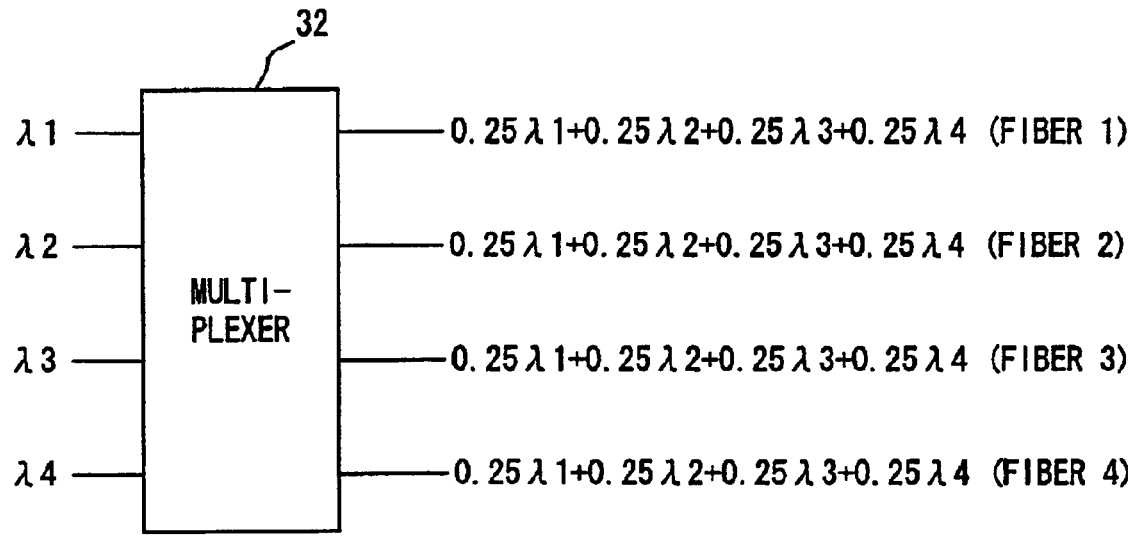
F I G. 2 7 A
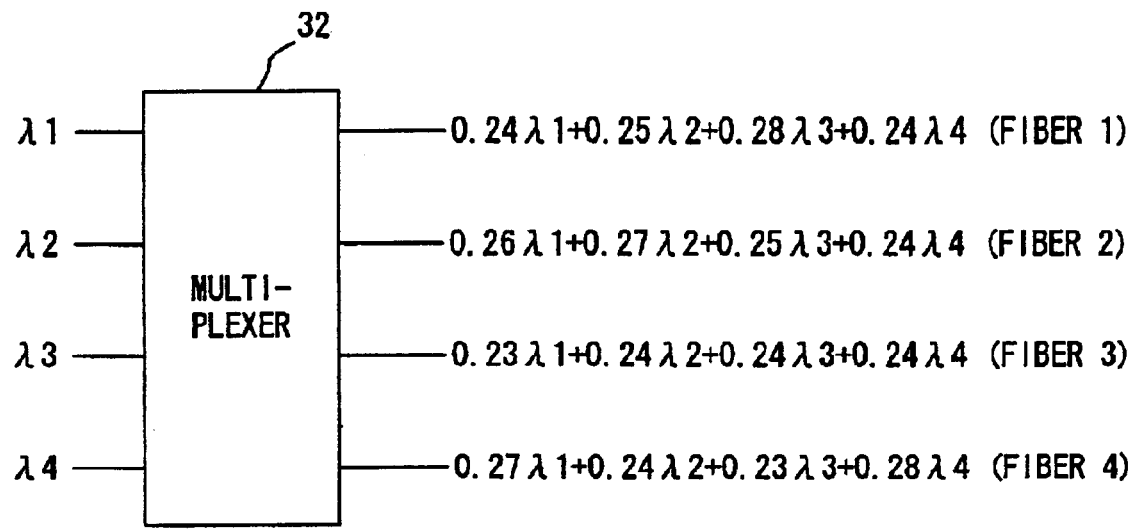
F I G. 2 7 B

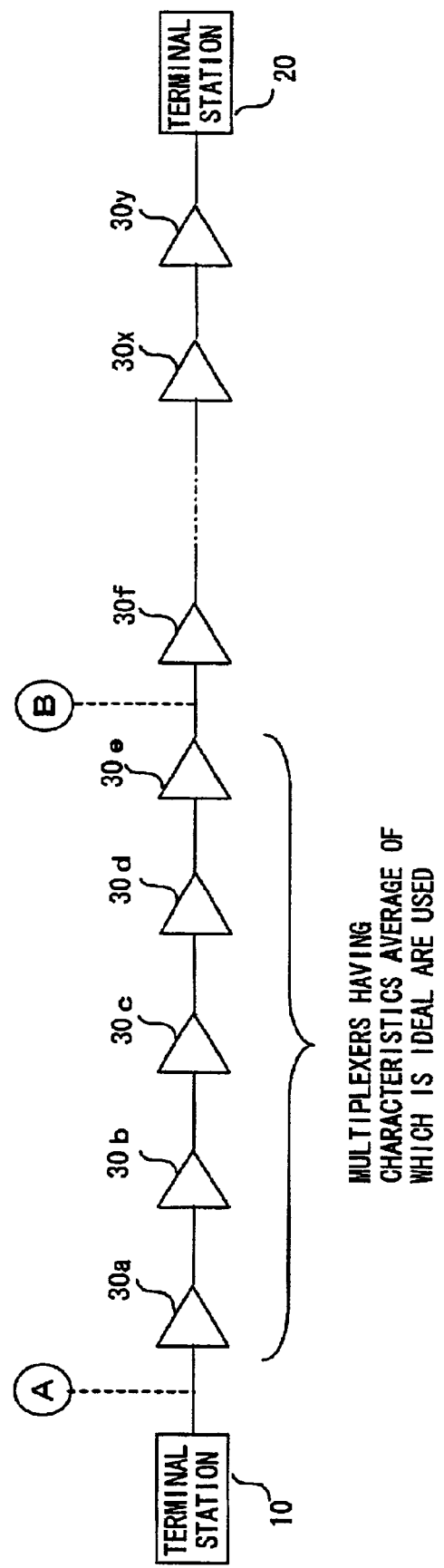
F I G. 2 8

OPTICAL TRANSMISSION SYSTEM AND METHOD

BACKGROUND OF THE INVENTION

1. Field of the Invention

The present invention relates to an optical transmission system, and more particularly, to an optical transmission system transmitting a multi-wavelength light by using Raman amplification.

2. Description of the Related Art

Conventionally, in a long-haul optical transmission system, 3-R processes (Re-timing, Re-shaping, and Re-generating) are executed in the state where an optical signal is once converted into an electric signal in each repeater, and the electric signal is reconverted into an optical signal, which is then transmitted to the next repeater. Currently, however, an optical amplifier that amplifies an optical signal without converting it into an electric signal is put into practical use, and a transmission system that adopts an optical amplifier as a linear repeater is under study. The repeater accompanied by the above described opt-electric conversion is replaced by an optical amplifier, so that the number of components configuring each repeater is significantly reduced. As a result, higher reliability and cost reduction promise to be achieved.

In the meantime, the amount of information transmitted via a network increases with the expansion of the Internet, and techniques for increasing the capacity of a transmission system are earnestly studied. A wavelength division multiplexing (WDM) optical transmission system is receiving attention as one method for increasing the capacity of a transmission system. The WDM optical transmission system is one way of multiplexing a plurality of signals by using a plurality of carriers having different wavelengths. With this system, the amount of information that can be transmitted over one optical fiber dramatically increases.

FIG. 1 shows the configuration of a general optical transmission system. In this system, a multi-wavelength light is transmitted from an optical transmitter 100 to an optical receiver 200. Namely, the optical transmitter 100 generates a multi-wavelength light by multiplexing signal lights having different wavelengths, and transmits the multi-wavelength light to a transmission line. In the meantime, the optical receiver 200 detects the respective signals by demultiplexing the received multi-wavelength light into the respective wavelengths. Here, the transmission line is an optical fiber, and optical amplifiers are spaced at predetermined intervals.

Each of the optical amplifiers is an erbium-doped fiber amplifier (EDFA). Here, the gain wavelength band of a general EDFA is a 1.55 $\mu$m band, whereas that of a gain shift EDFA (GS-EDFA) is a 1.58 $\mu$m band. The widths of these bands are approximately 30 nm, respectively. Accordingly, if EDFAs are spaced on a transmission line of a WDM optical transmission system, signal lights are transmitted by using carriers within these gain wavelength bands.

To increase the capacity of a transmission system, it is effective to increase the number of wavelengths to be multiplexed. One effective way of increasing the number of wavelengths to be multiplexed is to widen a gain wavelength band. In recent years, a Raman amplifier using Raman scattering has received attention as an optical amplification method that secures a wider gain wavelength band in comparison with an EDFA.

With Raman amplification, a gain is obtained on a side of a wavelength longer than that of a pump light by providing the pump light to an optical fiber. For example, in a 1.55 $\mu$m band, a gain is obtained on a side of a wavelength that is longer by approximately 100 nm than the wavelength of a pump light as shown in FIG. 2A. This amount of shift is 13.2 Tera Hz when converted into a frequency. Additionally, the Raman amplifier can amplify an arbitrary wavelength if only a corresponding pump light can be prepared.

The Raman amplifier is implemented by using the above described nature. To obtain a wide gain wavelength band, a plurality of pump lights having different central frequencies are used as shown in FIG. 2B. This method is recited, for example, by Y. Emori, et al., "100 nm bandwidth flat gain Raman amplifiers pumped and gain-equalized by 12-wavelength channel WDM high power laser diodes", OFC '99 PD19, 1999". As described above, a wider gain wavelength band can be obtained by using a plurality of pump lights.

FIG. 3 shows the configuration of a WDM optical transmission system using Raman amplification. A pump light for Raman amplification is usually provided to a transmission line optical fiber so that it is transmitted to a direction reverse to a signal light. At this time, if a plurality of pump lights are used as shown in FIG. 2B, pump lights output from a plurality of light sources having different oscillation frequencies are provided to the transmission line optical fiber by a wavelength coupler (wavelength multiplexer) or the like.

For a long-haul optical transmission system in which a plurality of Raman amplifiers are required on a transmission line, challenges to be technically improved remain left. Specifically, it is desired that the powers of signal lights included in a multi-wavelength light are equalized, namely, the gain wavelength characteristics for a multi-wavelength light are desired to be flattened. This problem must also be considered in the case where the characteristic of a transmission line is changed due to repair work or deterioration with time.

SUMMARY OF THE INVENTION

The present invention aims at improving the transmission characteristic of an optical transmission system in which a plurality of Raman amplifiers are positioned on an optical transmission line, and more particularly, at improving the transmission characteristic of an optical transmission system in which each of Raman amplifiers uses a plurality of pump lights.

An optical transmission system according to the present invention is configured so that one or a plurality of Raman amplifiers are arranged on an optical transmission line. Each of the Raman amplifiers comprises: a plurality of pump light sources for producing pump lights for Raman amplification; and a multiplexer for multiplexing the pump lights produced by the plurality of pump light sources and for providing the multiplexed pump light to the transmission line, on which a gain equalizer is arranged.

In this system, a gain equalizer is arranged on an optical transmission line, whereby a multi-wavelength light is transmitted by being equalized even when an optical signal is amplified with a plurality of Raman amplifiers.

An optical transmission system according to another feature of the present invention is configured so that a plurality of Raman amplifiers are arranged on an optical transmission line, and each of the plurality of Raman amplifiers uses a plurality of pump lights. If the power of a pump light having a first wavelength among the plurality of pump lights drops to a predetermined level or lower in a first Raman amplifier among the plurality of Raman amplifiers, the power of the pump light having the first wavelength or a wavelength that is substantially the same as the first wavelength is raised in one or some of the plurality of Raman amplifiers other than the first Raman amplifier.

If the power of the pump light having the first wavelength drops in this system, the Raman gain of the wavelength region corresponding to the first wavelength decreases. Accordingly, if the power of the pump light having the first wavelength or a wavelength that is substantially the same as the first wavelength is raised in another or other amplifiers, the Raman gain is compensated. At this time, if the amount of rise in the pump light power is shared by a plurality of Raman amplifiers, a load can be prevented from being concentrated on a particular pump light source.

An optical transmission system according to a further feature is configured so that the power of a pump light having a wavelength adjacent to a first wavelength is raised in a first Raman amplifier or another or other Raman amplifiers, if the power of the pump light having the first wavelength among a plurality of pump lights drops to a predetermined level or lower in the first Raman amplifier among a plurality of Raman amplifiers.

With this system, the power of the pump light having a wavelength adjacent to the first wavelength is raised when the power of the pump light having the first wavelength drops. As a result, a decrease in a Raman gain, which is caused by the drop in the power of the pump light having the first wavelength, is compensated.

An optical transmission system according to a still further feature of the present invention is configured so that a plurality of Raman amplifiers are positioned on an optical transmission line, and each of the Raman amplifiers uses a plurality of pump lights. Each of the Raman amplifiers comprises a multiplexer for multiplexing the plurality of pump lights and for providing the multiplexed pump light to the optical transmission line. A plurality of multiplexers correspondingly provided for the plurality of Raman amplifiers are selected and arranged so that an average of the characteristics of the plurality of multiplexers results in a predetermined characteristic.

In this system, an average of the characteristics of the plurality of multiplexers for multiplexing a plurality of pump lights becomes a predetermined characteristic. Therefore, a desired gain wavelength characteristic can be obtained as an entire system even if the characteristics of the multiplexers vary.

BRIEF DESCRIPTION OF THE DRAWINGS

FIG. 9 through FIG. 16 show modifications of a Raman amplifier;

FIGS. 27A and 27B show the characteristics of a multiplexer; and

FIG. 28 explains a method for establishing an optical transmission system.

DESCRIPTION OF THE PREFERRED EMBODIMENTS

Figure 4:
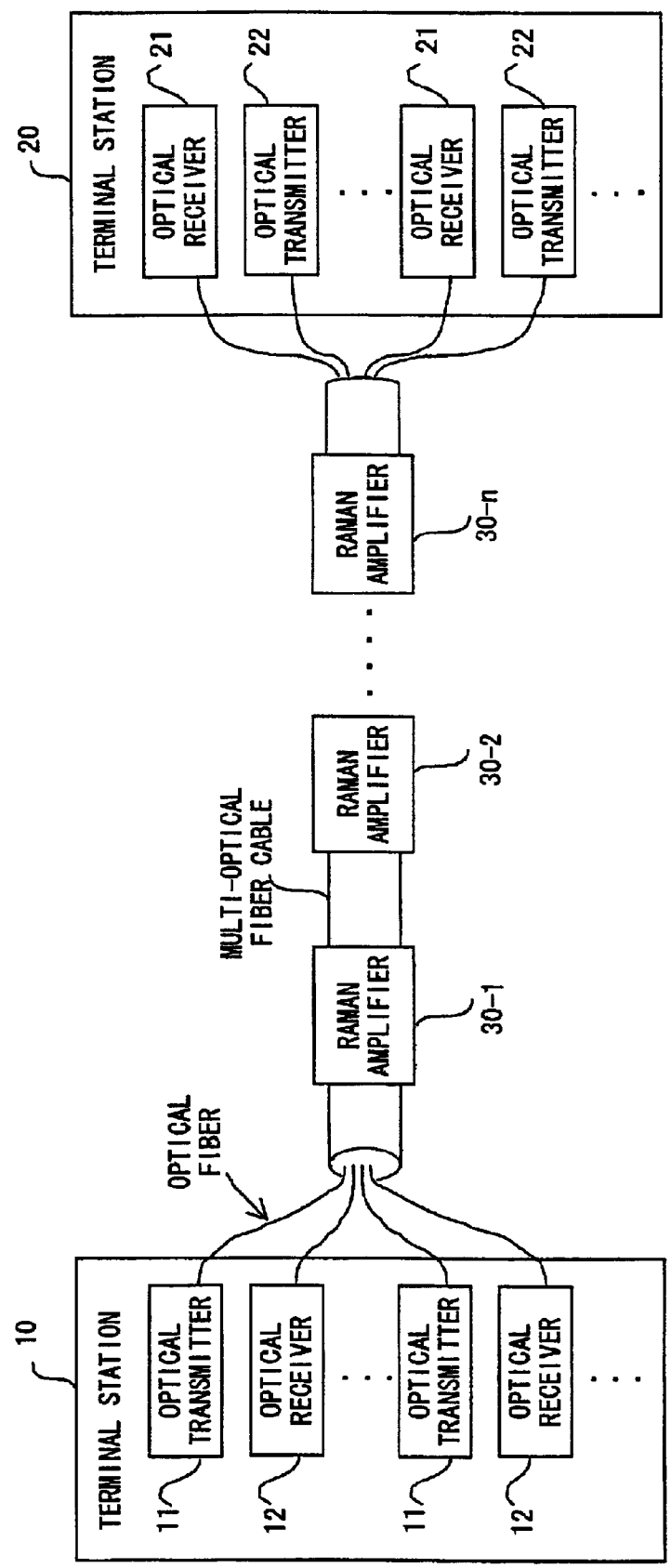
FIG. 4 shows the configuration of an optical transmission system according to an embodiment.

FIG. 4 shows the configuration of an optical transmission system according to an embodiment of the present invention. This transmission system comprises terminal stations 10 and 20, which are interconnected by a multi-optical fiber cable. Signals are bidirectionally transmitted between the terminal stations 10 and 20.

The terminal station 10 comprises a plurality of optical transmitters 11 and a plurality of optical receivers 12, whereas the terminal station 20 comprises a plurality of optical receivers 21 and a plurality of optical transmitters 22. A signal transmitted from each of the optical transmitters 11 is transmitted via an optical fiber, and received by a corresponding one of the optical receivers 21. In the meantime, a signal transmitted from each of the optical transmitters 22 is transmitted via an optical fiber, and received by a corresponding one of the optical receivers 12. The transmitters 11 and 22 respectively transmit a multi-wavelength light. Namely, a multi-wavelength light is transmitted via each of optical fibers configuring the multi-optical fiber cable in this transmission system.

On the transmission line between the terminal stations 10 and 20, a plurality of Raman amplifiers 30-1 through 30-n are spaced. Each of the Raman amplifiers 30-1 through 30-n amplifies a multi-wavelength light transmitted via each of the optical fibers configuring the multi-optical fiber cable. A pump light is provided to an optical fiber, so that Raman amplification occurs in the optical fiber itself. Accordingly, a Raman amplifier is configured by an optical fiber, and a device that provides a pump light to the optical fiber. However, a device that provides a pump light to an optical fiber is sometimes referred to as a Raman amplifier. Additionally, each Raman amplifier may be arranged within an optical repeater.

Figure 5:
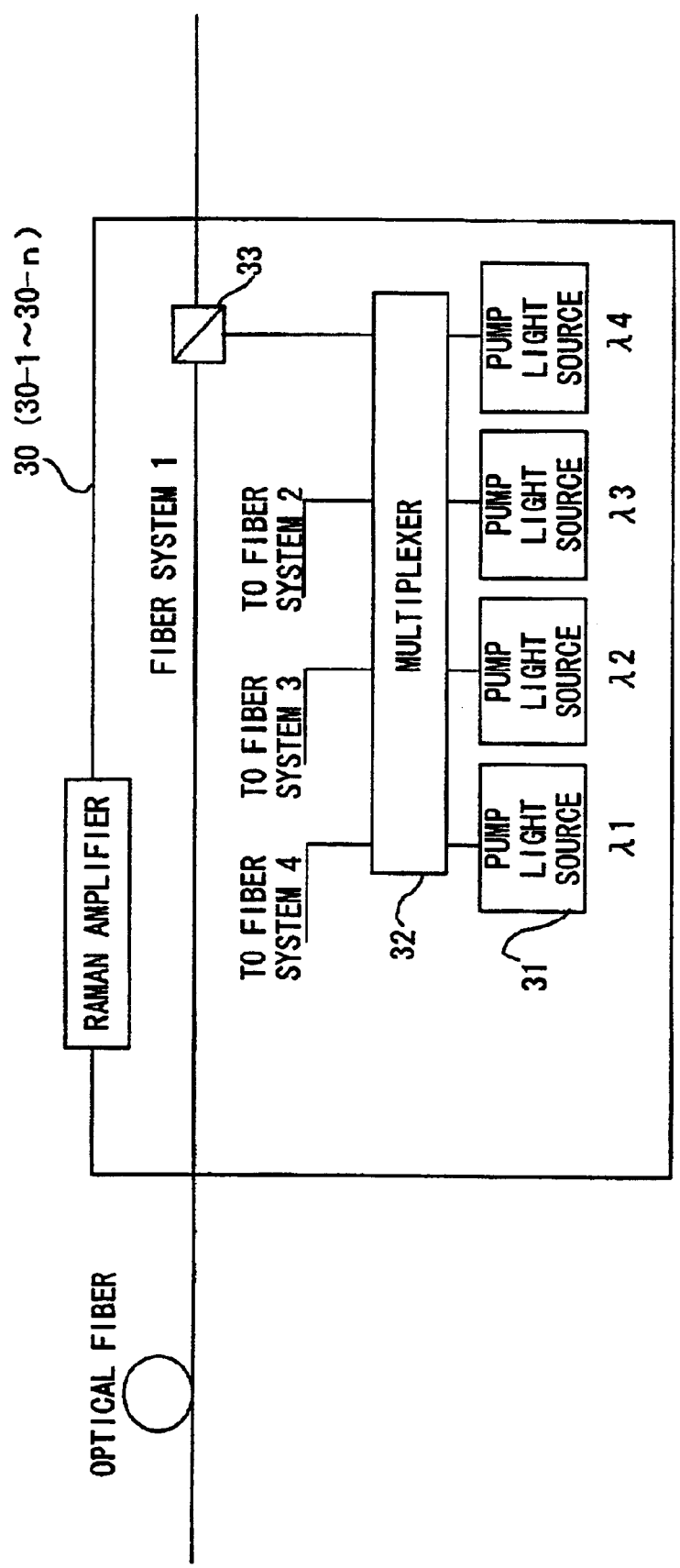
FIG. 5 shows the configuration of a Raman amplifier.

FIG. 5 shows the configuration of a Raman amplifier 30. Note that the Raman amplifiers 30-1 through 3-n fundamentally have the same configuration. The Raman amplifier 30 represents an arbitrary one of the Raman amplifiers 30-1 through 30-n.

The Raman amplifier 30 comprises a plurality of pump light sources 31, a multiplexer 32, and a WDM coupler 33. The plurality of pump light sources 31 respectively produce pump lights having different wavelengths. In this embodiment, pump lights having wavelengths λ1 through λ4 are produced by the 4 pump light sources. Each of the pump light sources 31 is, for example, a laser diode. The laser diode normally outputs a light having power that corresponds to a given electric current. Additionally, most laser diodes have aback power monitor capability for detecting optical power of output light. Hereinafter, it is assumed that the optical power of output light of each of the pump light sources 31 can be detected with the back power monitor capability or other methods.

The multiplexer 32 multiplexes the pump lights output from the plurality of pump light sources 31. In this embodiment, the multiplexer 32 multiplexes the pump lights having the wavelengths λ1 through λ4. Furthermore, the multiplexer 32 comprises a plurality of output ports, and outputs the multiplexed pump light via each of the output ports. The configuration of the multiplexer 32 will be described in detail later.

The WDM coupler 33 is arranged for each of optical fibers accommodated by a multi-optical fiber cable, and provides the multiplexed pump light from the multiplexer 32 to a corresponding optical fiber. At this time, the multiplexed pump light is input to the optical fiber so that it is transmitted in a direction reverse to a signal light. In FIG. 5, a "fiber system" indicates each of the optical fibers accommodated by the multi-optical fiber cable.

In the example shown in FIG. 5, four pump light sources 31 are arranged within the Raman amplifier 30. However, the present invention is not limited to this implementation. The number of pump light sources 31 may be determined, for example, based on a required gain wavelength bandwidth. Additionally, the number of pump light sources 31 and that of optical fibers are the same in this example, however, the present invention is not limited to this implementation. These numbers may differ from each other.

Figure 6:
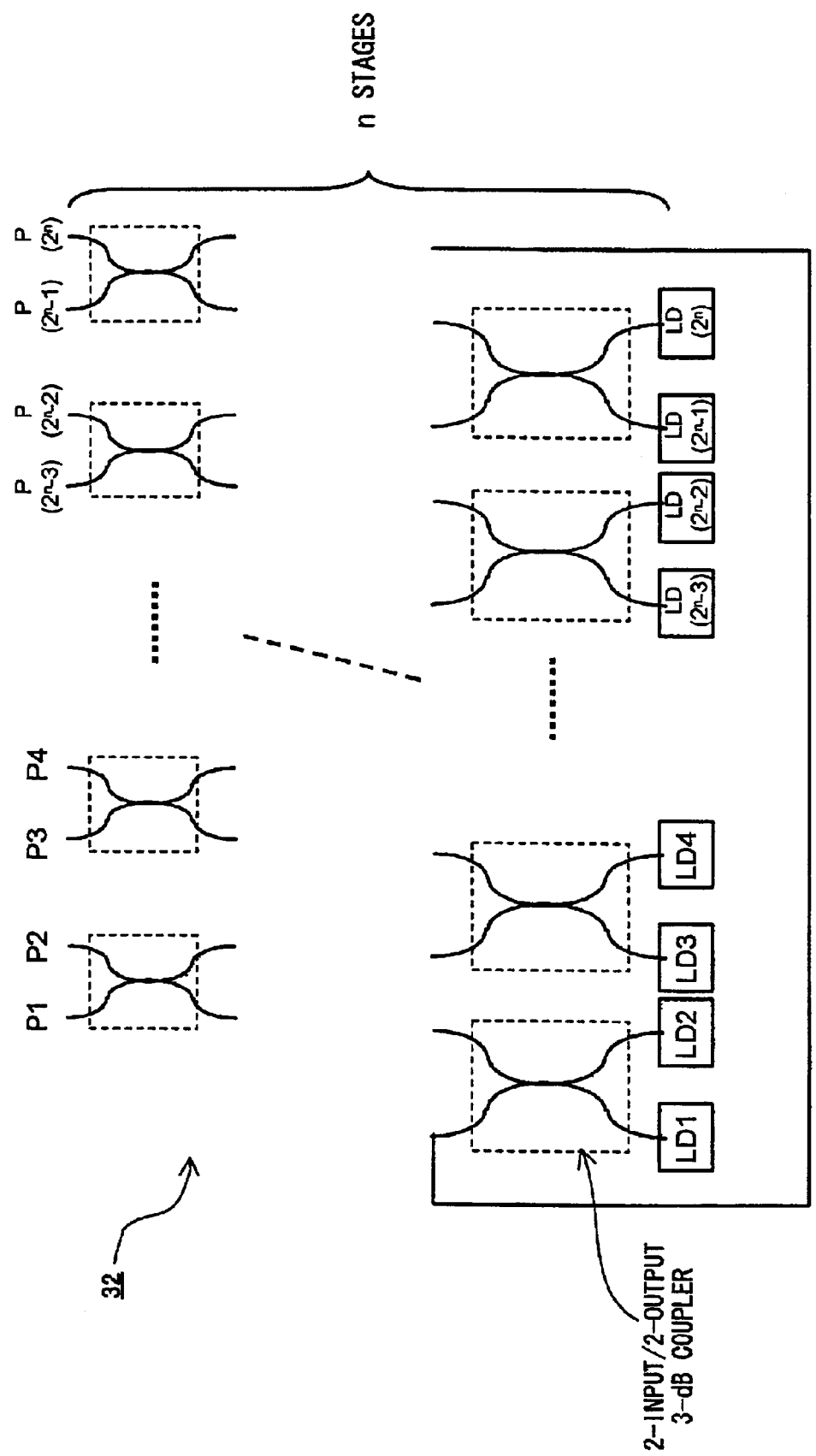
FIG. 6 shows an embodiment of a multiplexer.

FIG. 6 shows an embodiment of the multiplexer 32. This embodiment shows the configuration where pump lights produced by $2^n$ pump light sources (LD1 through LD($2^n$)) are multiplexed, and output from $2^n$ output ports (P1 through P($2^n$)).

Figure 7:
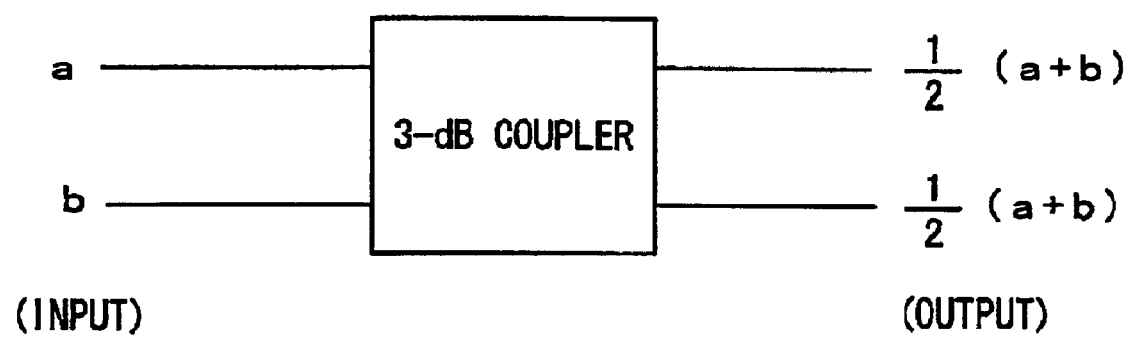
FIG. 7 exemplifies a 2-input/2-output 3-dB coupler configuring the multiplexer shown in FIG. 6.

The multiplexer 32 is implemented by a n-stage optical coupler group. Here, each of the optical couplers is a 2-input/2-output 3-dB coupler shown in FIG. 7. This 2-input/2-output 3-dB coupler couples lights input from the 2 input ports, and outputs the coupled light from the output ports. The coupled lights output from the output ports are fundamentally the same. Accordingly, a plurality sets of multiplexed light that are obtained by multiplexing the pump lights produced by the pump light sources are output from the output ports of the multiplexer 32 shown in FIG. 6. At this time, the multiplexed lights output from the output ports are fundamentally the same each other.

Figure 8:
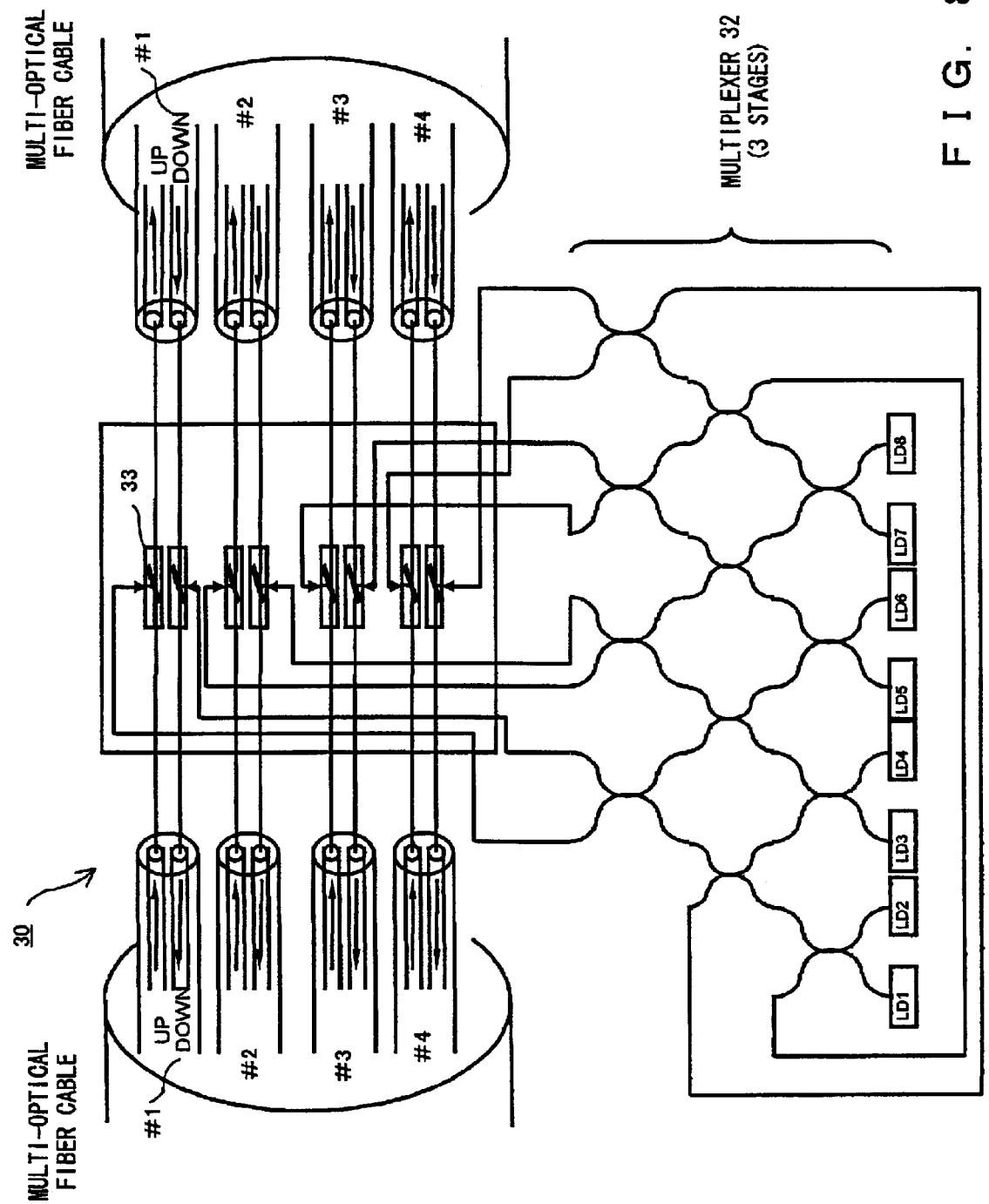
FIG. 8 shows an embodiment of a Raman amplifier.

FIG. 8 shows an embodiment of the Raman amplifier 30. Here, the Raman amplifier 30 comprises 8 ($=2^3$) laser diodes LD1 through LD8 as a plurality of pump light sources 31. Additionally, a multi-optical fiber cable accommodates 8 optical fibers.

The laser diodes LD1 through LD8 respectively output pump lights having different wavelengths. The multiplexer 32 is an optical coupler group that is configured by 3 stages, and comprises 8 output ports. Here, the multiplexer 32 corresponds to the case of "n=3" in FIG. 6. The multiplexer 32 multiplexes the pump lights from the laser diodes LD1 through LD8 to produce eight sets of multiplexed pump light, and outputs the multiplexed pump light via each of the output ports.

Figure 1:
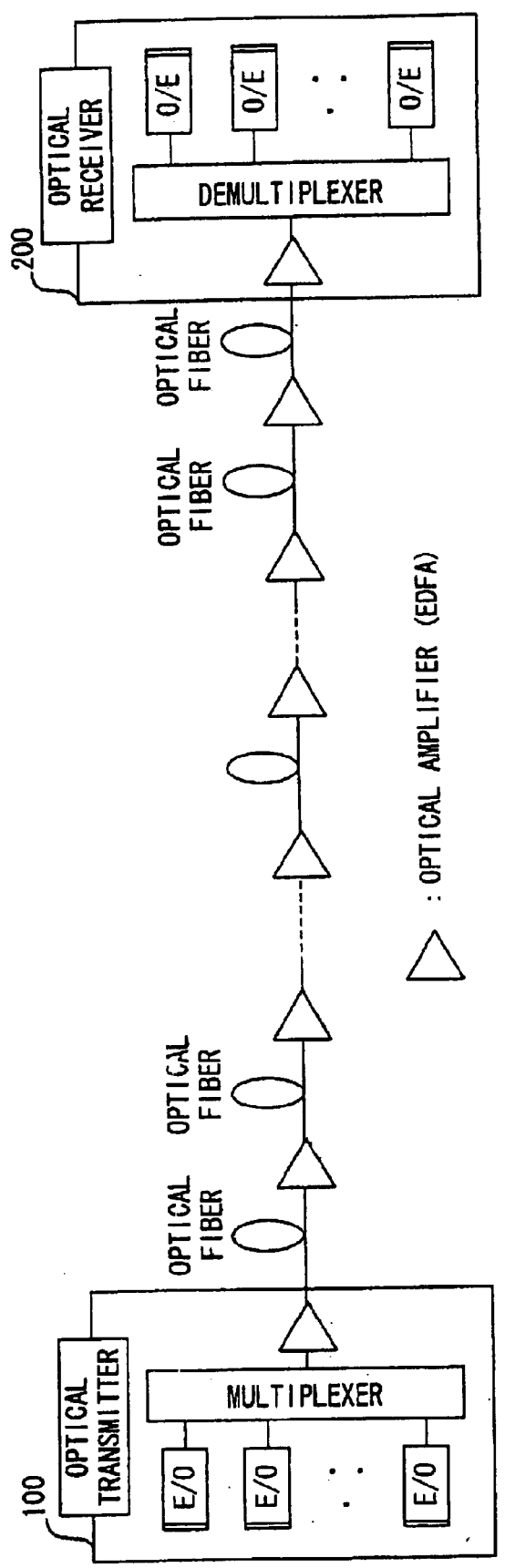
FIG. 1 shows the configuration of a general optical transmission system.
Figure 2A:
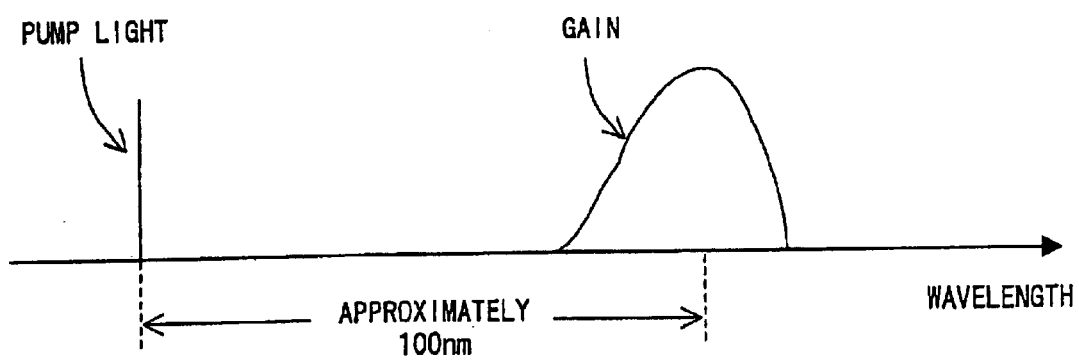
FIG. 2A and FIG. 2B explain the principle of Raman amplification.
Figure 2B:
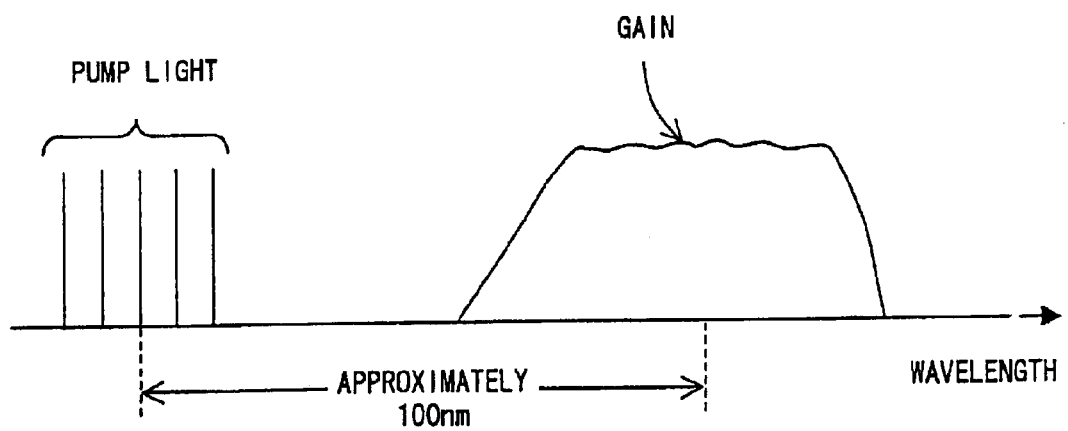
Figure 3:
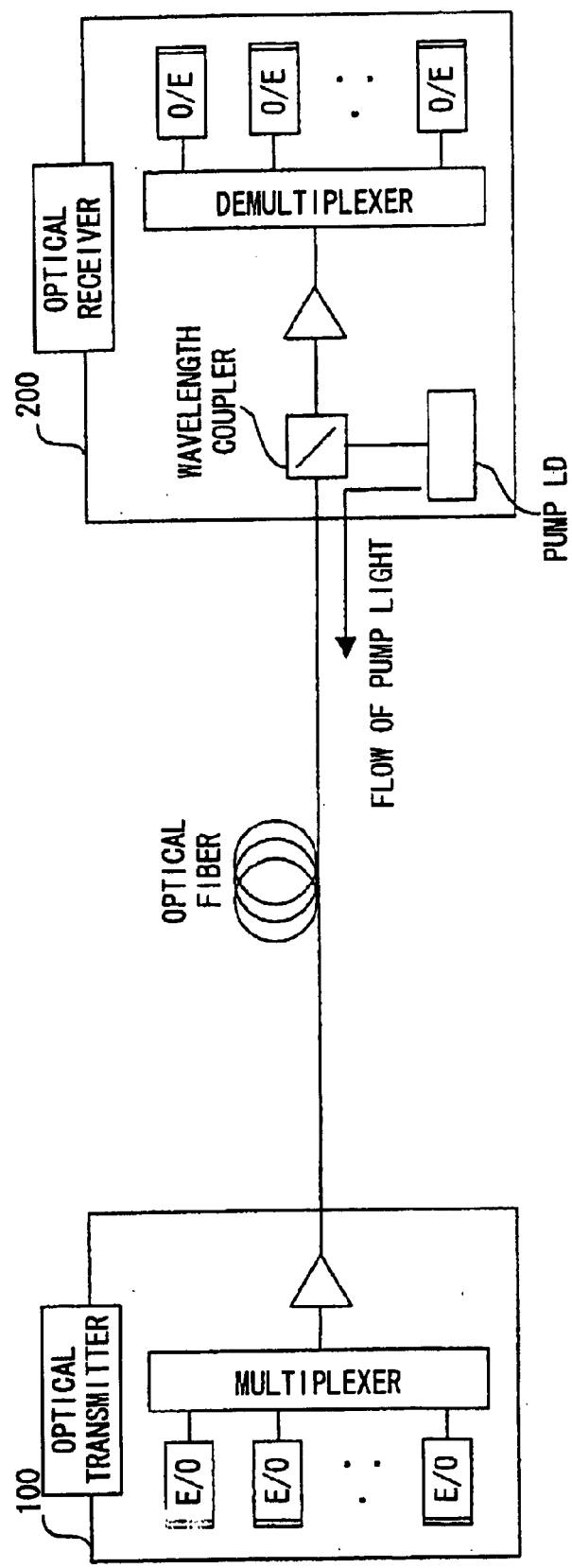
FIG. 3 shows the configuration of a WDM optical transmission system using Raman amplification.

The WDM coupler 33 is arranged for each of the optical fibers accommodated by the multi-optical fiber cable. Each of the WDM couplers 33 receives the multiplexed pump light from a corresponding output port of the multiplexer 32, and inputs the received light to a corresponding optical fiber. At this time, the multiplexed pump light is input so that it is transmitted in a direction reverse to a signal light. In this way, the pump lights produced by the laser diodes LD1 through LD8 are provided to the optical fibers, each of which obtains the amplification operation shown in FIG. 2B.

Next, modifications of the above described Raman amplifier are exemplified. The Raman amplifiers described below are based on the configuration that is explained with reference to FIGS. 5 through 8. However, the following embodiments assume the case where pump lights are provided to 4 optical fibers.

Figure 9:
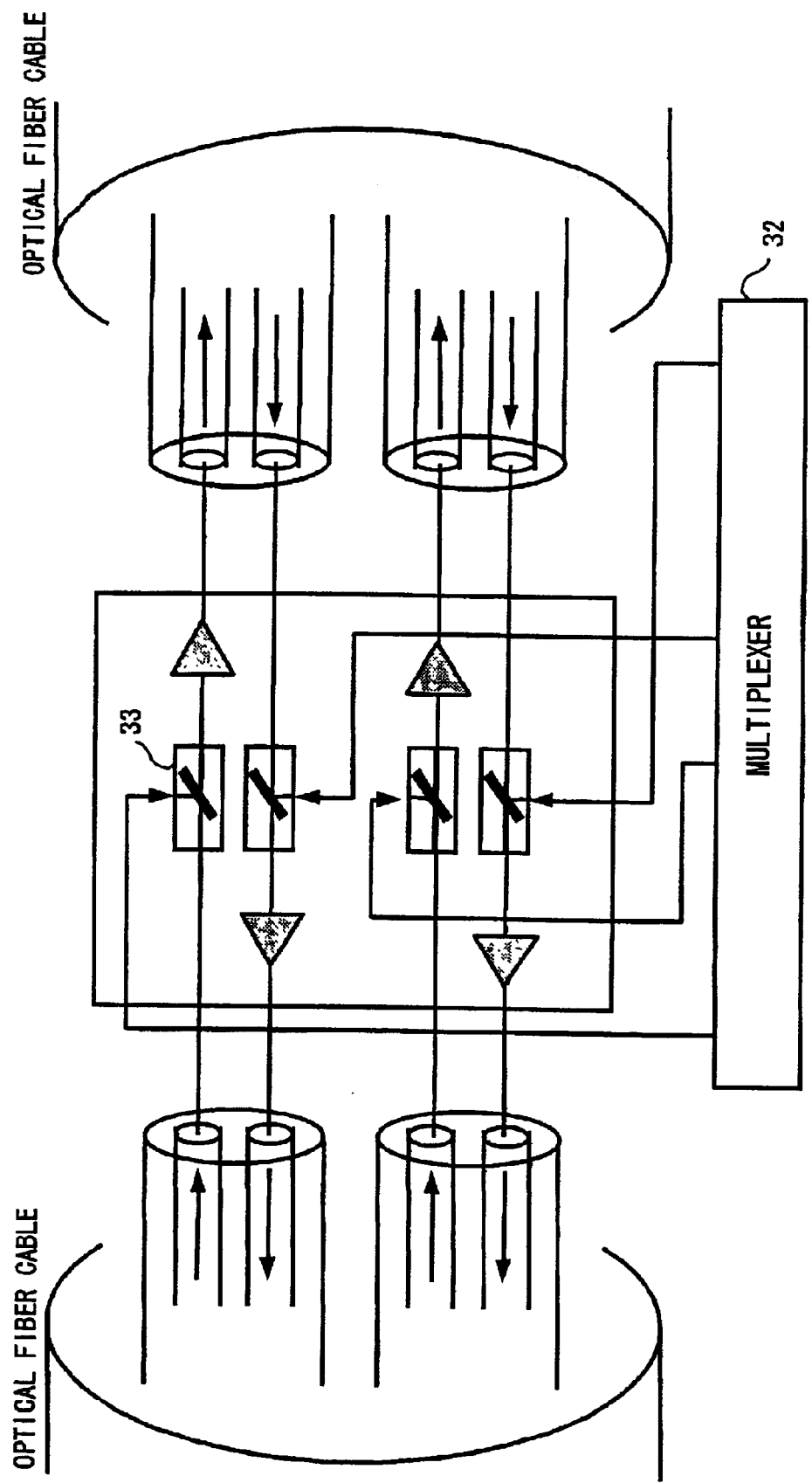

In the configuration shown in FIG. 9, an EDFA is arranged for each optical fiber. Namely, in this configuration, a multi-wavelength light including a plurality of signal lights is further amplified by the EDFA after it is amplified by a Raman amplifier.

Figure 10:
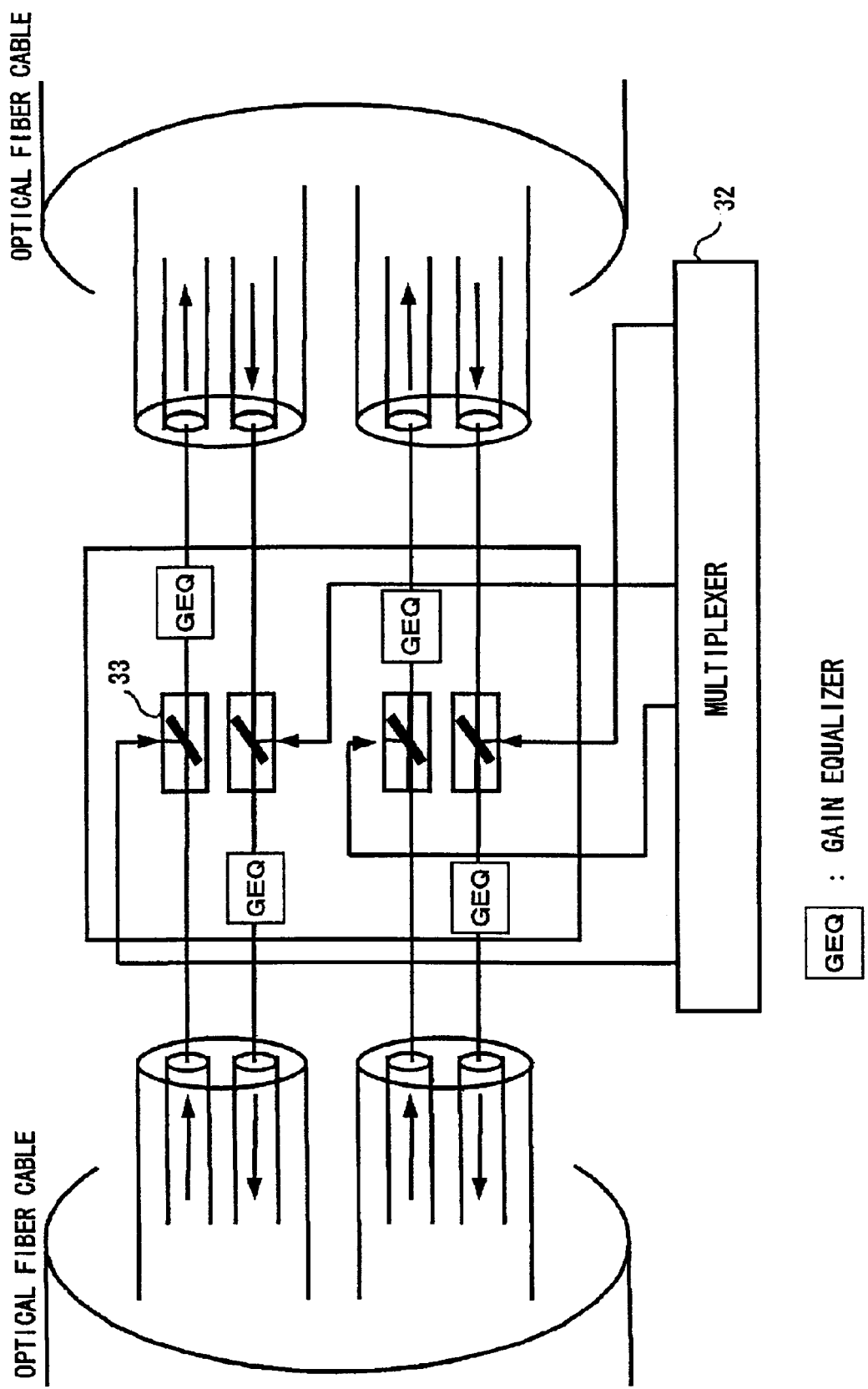

In the configuration shown in FIG. 10, a gain equalizer is arranged for each optical fiber. This gain equalizer is designed or adjusted, for example, to compensate for the wavelength characteristic of the gain of a Raman amplifier, or to equalize the power of each of signal lights included in a multi-wavelength light amplified by a Raman amplifier.

Figure 11:
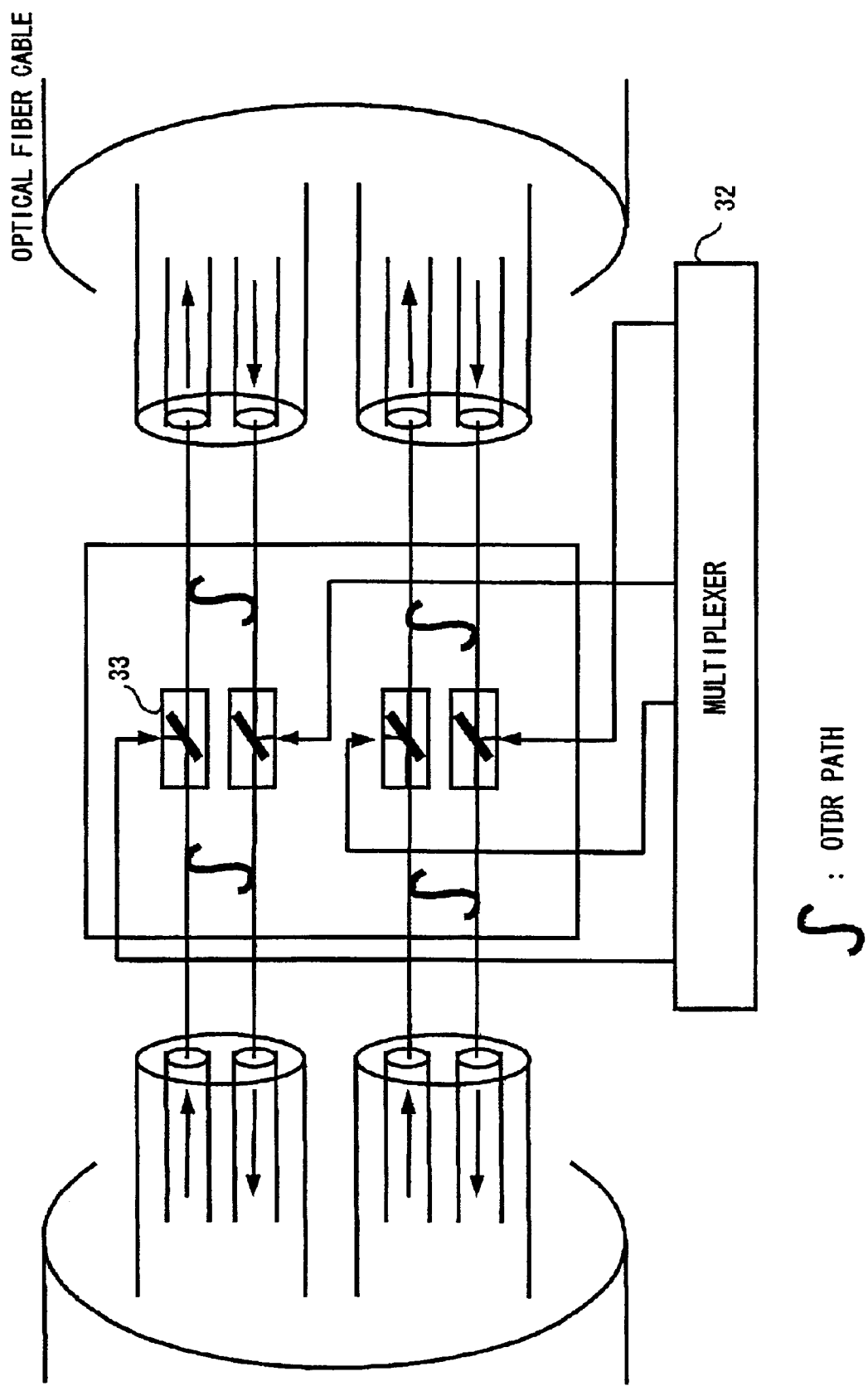

In the configuration shown in FIG. 11, OTDR (Optical Time Domain Reflectometry) paths are arranged between a pair of upstream and downstream fibers. Note that the OTDR paths are arranged before and after each multiplexer 33. As a result, a fiber sensor for determining a position is implemented.

Figure 12:
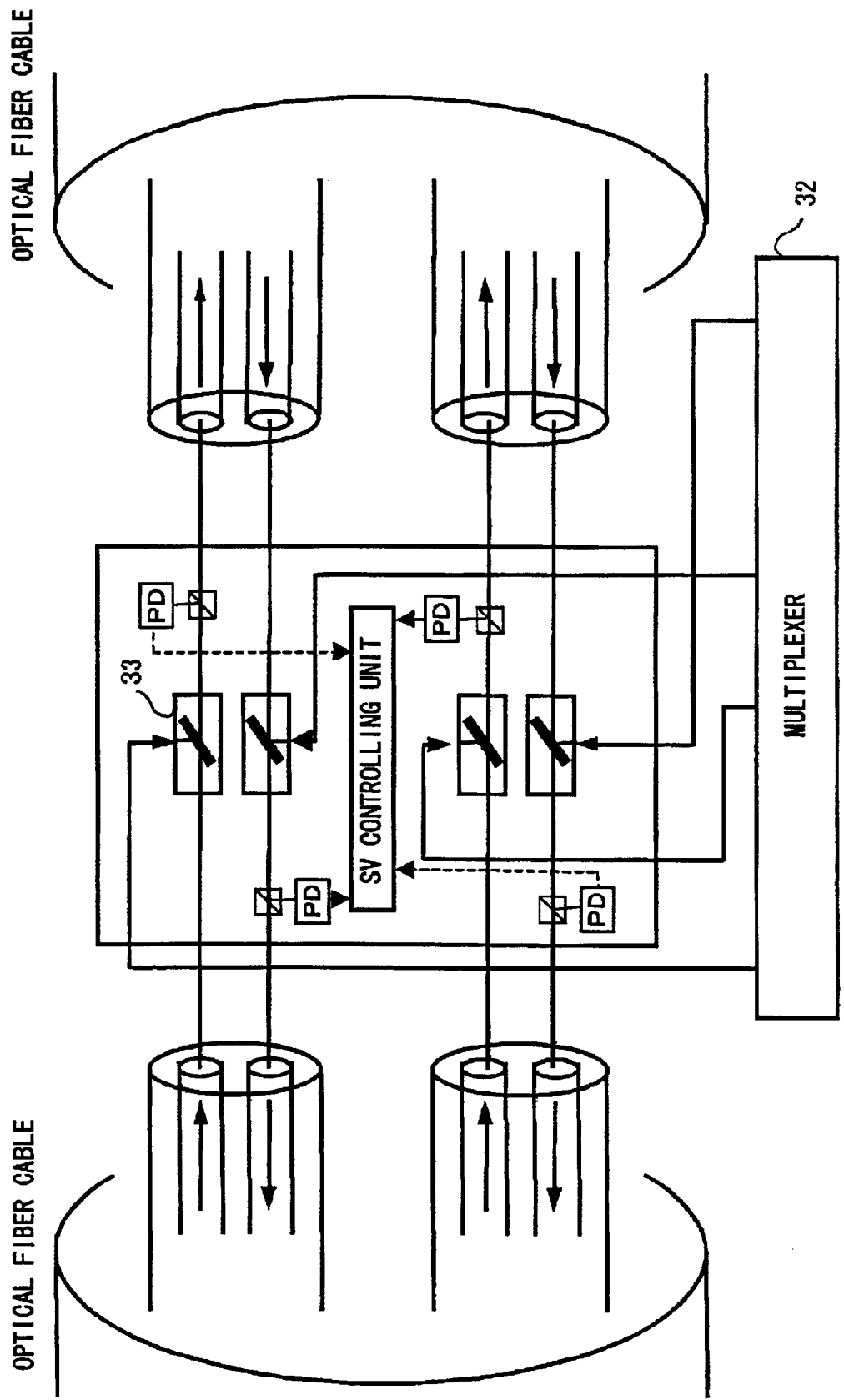

In the configuration shown in FIG. 12, an SV signal receiving module is arranged for each optical fiber. An SV signal that is received by each SV signal receiving module is processed by an SV controlling unit. Here, the SV signal is a control signal for monitoring this optical transmission system, and transmitted, for example, from the terminal station 10 or 20 by using a carrier having a predetermined wavelength. In this case, the SV signal receiving module is configured by a demultiplexer that splits a signal light including the SV signal from a multi-wavelength light, and a photoelectric element (such as a photodiode (PD)) that converts the signal light split by the demultiplexer into an electric signal. The SV controlling unit detects the normal functioning of a transmission line or other different optical repeaters based on the SV signal transmitted via each optical fiber. Notice that pump light sources are omitted in FIGS. 9 through 12.

In the configuration shown in FIG. 13, a feedback control capability (ALC: Automatic Level Control) is arranged so that the power of a multi-wavelength light output from this device becomes a predetermined level. This capability is implemented by an optical splitter for splitting part of a multi-wavelength light, a photoelectric element (such as a photodiode (PD)) for detecting part of the multi-wavelength light split by the splitter, an optical variable attenuator for adjusting the output level of the multiplexer 32, and a controlling unit for adjusting the attenuation amount of the optical variable attenuator in accordance with the output of the photoelectric element.

In the configuration shown in FIG. 14, optical isolators are respectively interposed between the multiplexer 32 and the WDM couplers 33. Each of the optical isolators intercepts the light traveling from the corresponding WDM coupler 33 toward the multiplexer 32.

Figure 15:
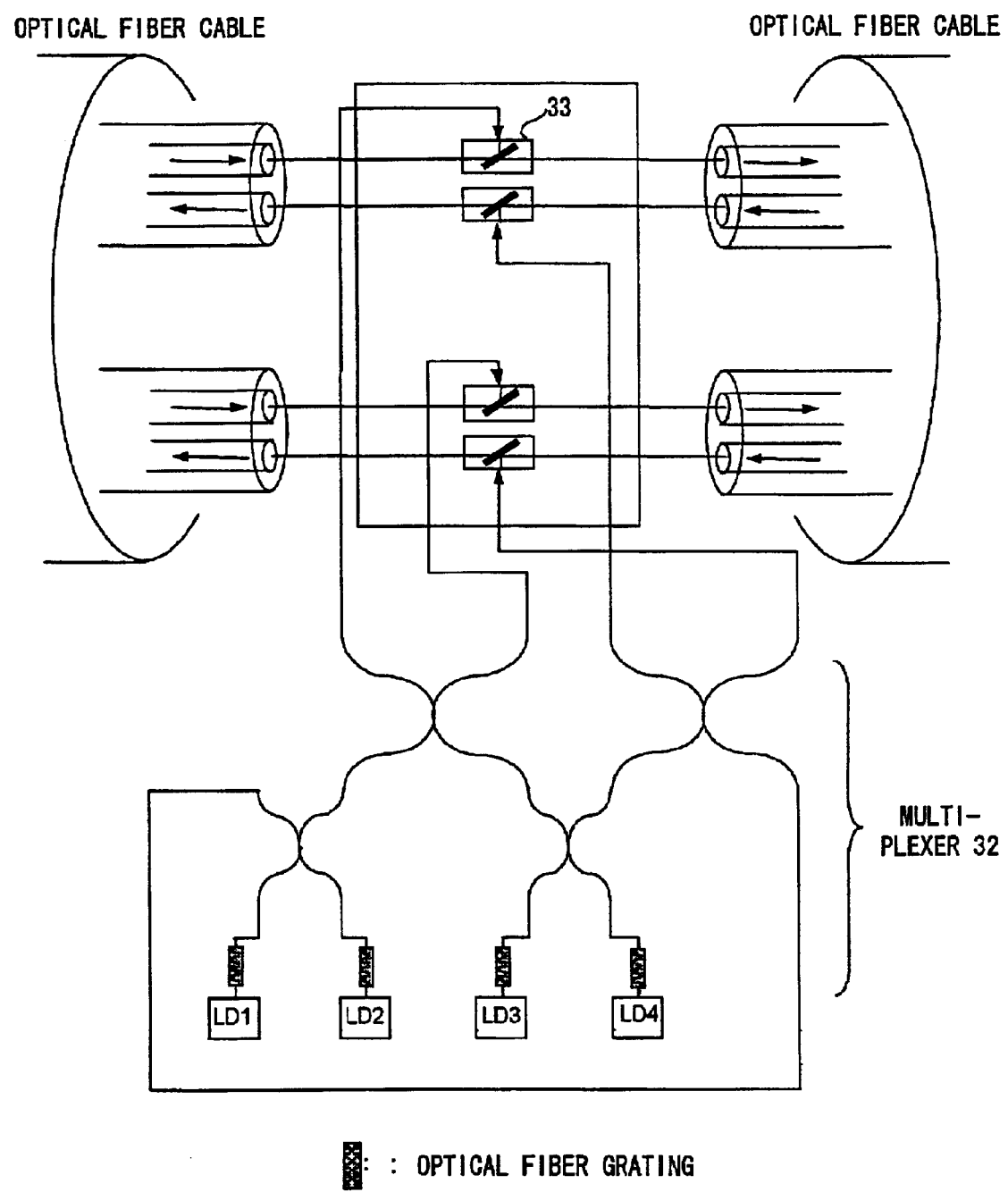

In the configuration shown in FIG. 15, optical fiber grating filters are respectively arranged between the pump light sources LD1 through LD4 and the multiplexer 32. As an optical fiber grating filter, a filter with a narrowband (for example, a 3-dB bandwidth that is equal to or less than 1 nm), and a low reflection rate (for example, 1 to 15 percent) is used. As a result, the oscillation wavelength of the pump light produced by each of the pump light sources is fixed.

In the configuration shown in FIG. 16, optical circulators are arranged as substitutes for the WDM couplers 33. In this case, pump lights output from the multiplexer 32 are input to the optical fibers so that they are transmitted in a direction reverse to a signal light.

Figure 17:
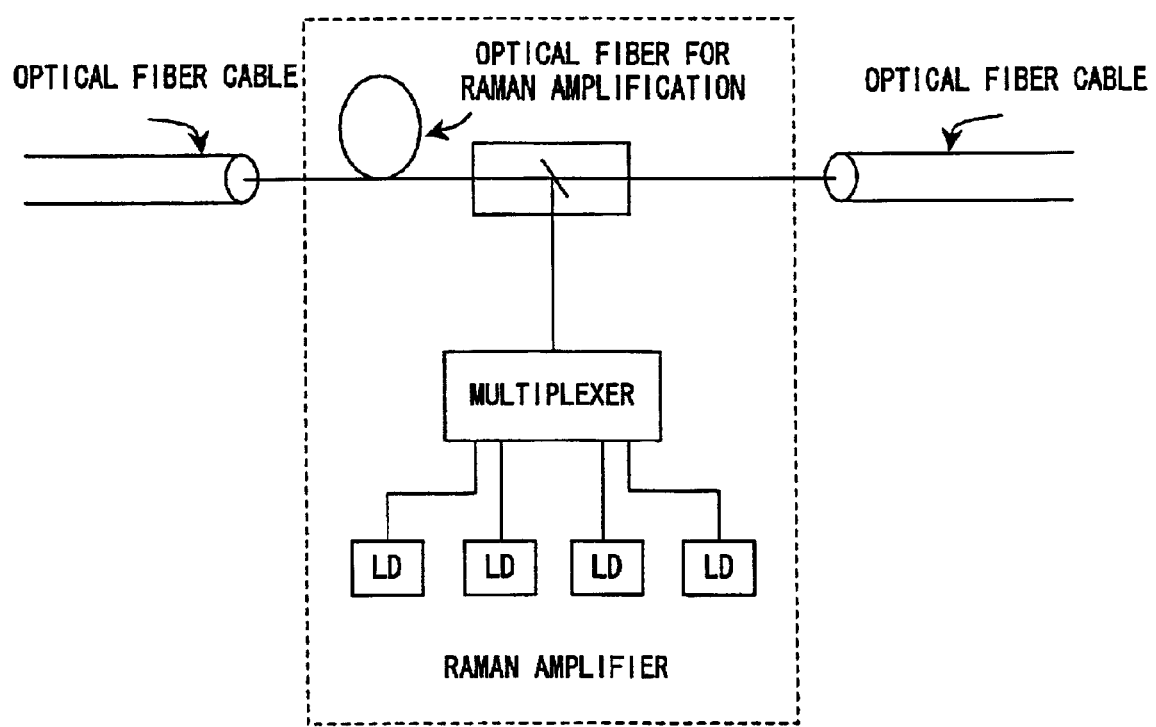
FIG. 17 shows the configuration in which an optical fiber for Raman amplification is arranged within an amplifier.

FIGS. 8 through 16 show the configurations where Raman amplification is performed by using the optical fibers connected to the Raman amplifier. However, the Raman amplifier according to the present invention may be configured in such a way such that an optical fiber for Raman amplification is arranged within the Raman amplifier itself, as shown in FIG. 17.

Figure 18:
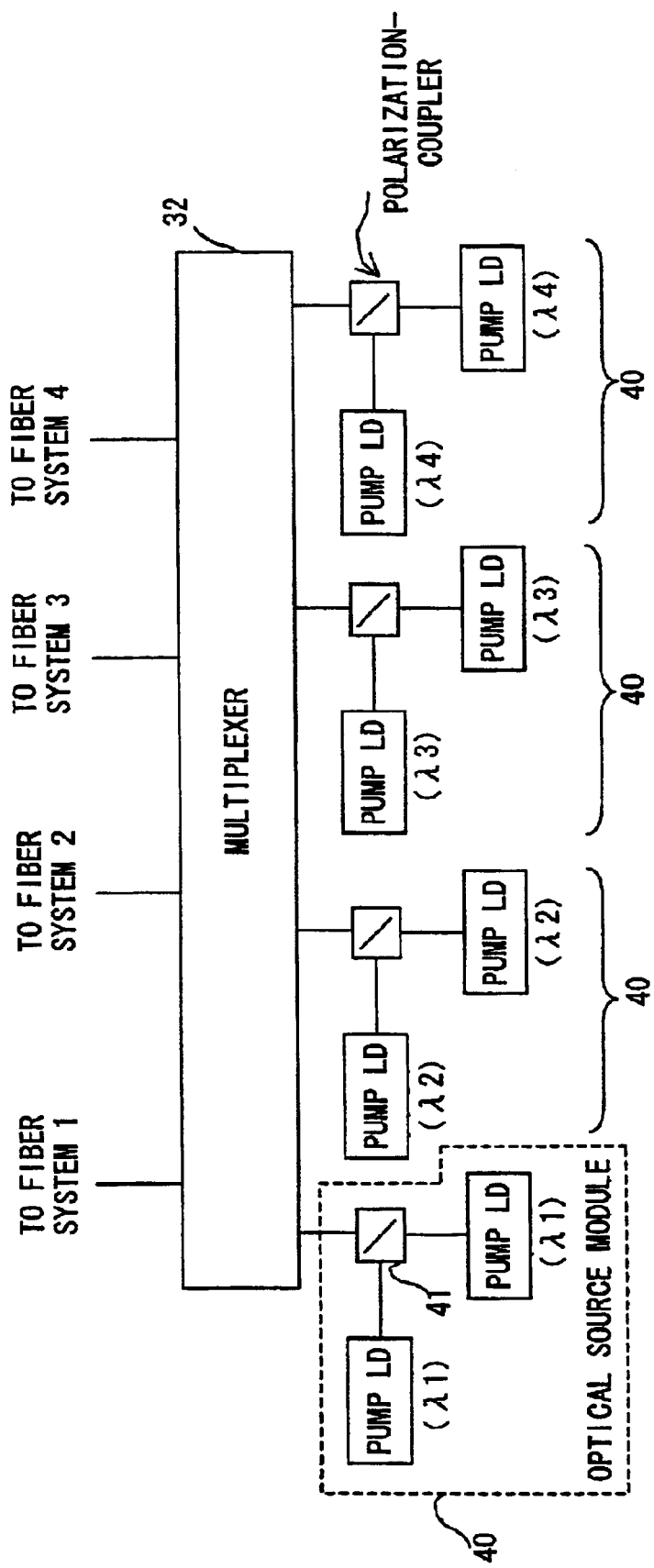
FIG. 18 exemplifies a device producing pump lights whose polarizations are orthogonal for Raman amplification.

FIG. 18 exemplifies an embodiment of a device producing pump lights the polarizations of which are orthogonal for Raman amplification. This device comprises a plurality of light source modules 40 producing pump lights having different wavelengths. Each of the light source modules 40 comprises a pair of pump light sources producing pump lights having the same wavelength, and a polarization coupler 41 polarization-couples the pump lights produced by the pair of pump light sources. As a result, each of the light source modules 40 outputs a pump light the polarizations of which are orthogonal. Pump lights output from the light source modules 40 are multiplexed by the multiplexer 32. The plurality sets of multiplexed pump light are provided to a plurality of optical fibers.

In the embodiment shown in FIG. 18, a ratio of the number of optical fibers to which a pump light is to be provided, to the number of pump light sources is "1:2", and pump lights produced by a pair of pump light sources are polarization-coupled. However, the present invention is not limited to this configuration. Namely, the present invention may be configured in such a way that the wavelengths of pump lights produced by a pair of pump light sources may differ from each other, as far as the ratio of the number of optical fibers to which a pump light is to be provided to the number of pump light sources is "1:2". In this case, the pump lights produced by the pair of pump light sources are multiplexed by, for example, a WDM coupler.

As described above, with the Raman amplifier according to this embodiment, a plurality of pump lights having different wavelengths are multiplexed, and the multiplexed pump light is provided to a plurality of optical fibers. Here, the plurality of pump lights are multiplexed by using a plurality of optical devices (optical couplers in the embodiment) as explained with reference to FIGS. 6 and 7. At this time, it is desirable that the levels of the pump lights having respective wavelengths included in the multiplexed pump light are fundamentally identical.

However, in the above described configuration, the characteristics (especially, split ratio) of the optical couplers vary although they are slight. Therefore, the levels of pump lights having respective wavelengths included in the multiplexed pump light that is obtained by the multiplexer 32 are not identical frequently. If Raman amplification is performed by using such a multiplexed pump light, a gain for amplifying a signal light will have wavelength dependence. Additionally, as shown in FIG. 4, the above described wavelength characteristic of the gain can possibly be accumulated in a transmission system where a plurality of Raman amplifiers are spaced on a transmission line.

Figure 19:
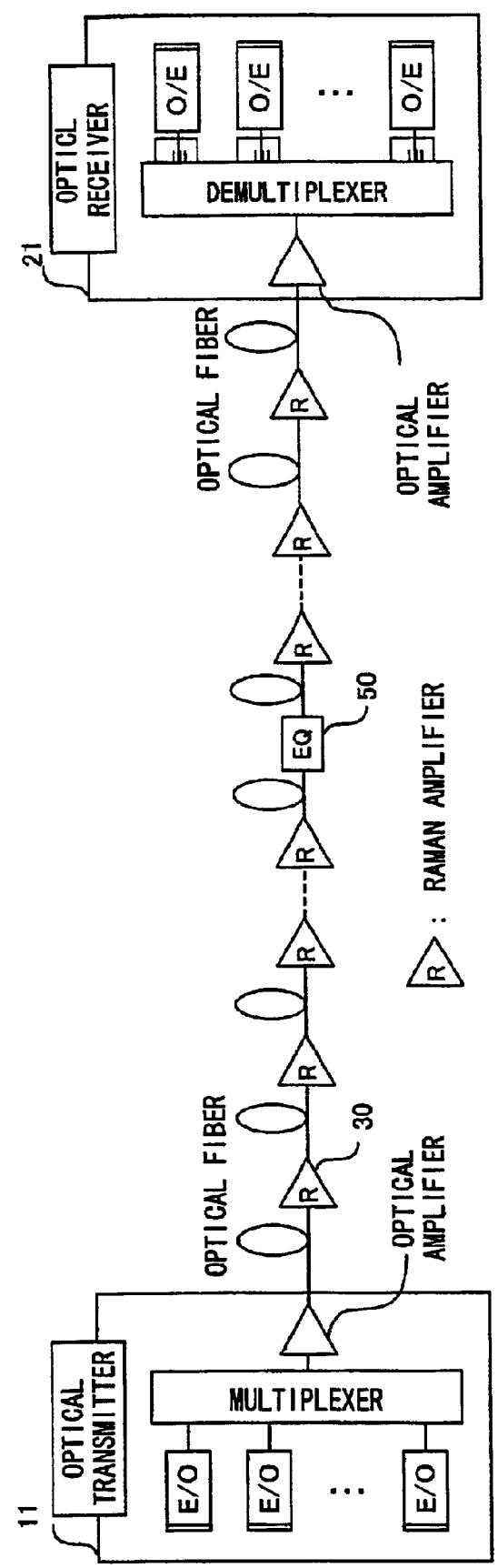
FIG. 19 shows the configuration of an optical transmission system according to another embodiment.

FIG. 19 shows the configuration of the optical transmission system according to an embodiment. This transmission system comprises a plurality of Raman amplifiers 30 on a transmission line between the optical transmitter 11 and the optical receiver 21. The Raman amplifier 30 is the one explained with reference to FIGS. 5 through 18. Additionally, FIG. 19 shows the transmission line between a pair of the optical transmitter 11 and the optical receiver 21. However, the transmission line may be part of the system shown in FIG. 4. In this case, each of the Raman amplifiers 30 collectively amplifies signals transmitted via a plurality of optical fibers accommodated by a multi-optical fiber cable.

In this embodiment, one or a plurality of gain equalizers 50 are arranged on the transmission line. To be more specific, one gain equalizer 50 is arranged, by way of example, for several tens of Raman amplifiers. Notice that the gain equalizer 50 is arranged for each optical fiber. Namely, the gain equalizer 50 is arranged for each optical fiber in the system shown in FIG. 4.

An equalizer having an equalization characteristic that is fixedly preset or a variable equalizer having an equalization characteristic that can be dynamically changed may be available as the gain equalizer 50. If the former equalizer is used, for example, a suitable equalizer is selected while transmitting a signal after a transmission system is built. Specifically, for instance, a multi-wavelength light is actually transmitted, and a gain equalizer with which the powers of a plurality of signal lights included in the multi-wavelength light are equalized is selected and then installed.

If the variable gain equalizer is used, the gain characteristic of each variable equalizer is dynamically adjusted by feedback control. To be more specific, by way of example, the characteristic of each variable equalizer is adjusted to equalize a plurality of signal lights included in the multi-wavelength light by the optical receiver 21, which monitors the multi-wavelength light. In this configuration, a gain deviation remains small even if the characteristic of a transmission line changes. Note that an existing equalizer is available as the gain equalizer 50. The gain equalizer (especially, the variable gain equalizer) is recited, for example, by Japanese Laid-open Patent Publication No. 11-212044 or No. 11-224967.

In the transmission system having the above described configuration, a gain deviation is reduced by arranging the equalizer 50 even if the gain obtained by the Raman amplifier 30 has wavelength dependence. That is, if the powers of a plurality of pump lights provided for Raman amplification are not even, a multi-wavelength light transmitted via this transmission line is suitably equalized. Furthermore, in the system having the above described configuration, the gain deviation of the entire system is reduced even if variations exist in the transmission loss of a transmission line fiber, a nonlinear execution area of a transmission fiber, and a Raman gain coefficient.

Explained next is a method for minimizing an influence of a fault when the fault occurs in the optical transmission system.

Figure 20:
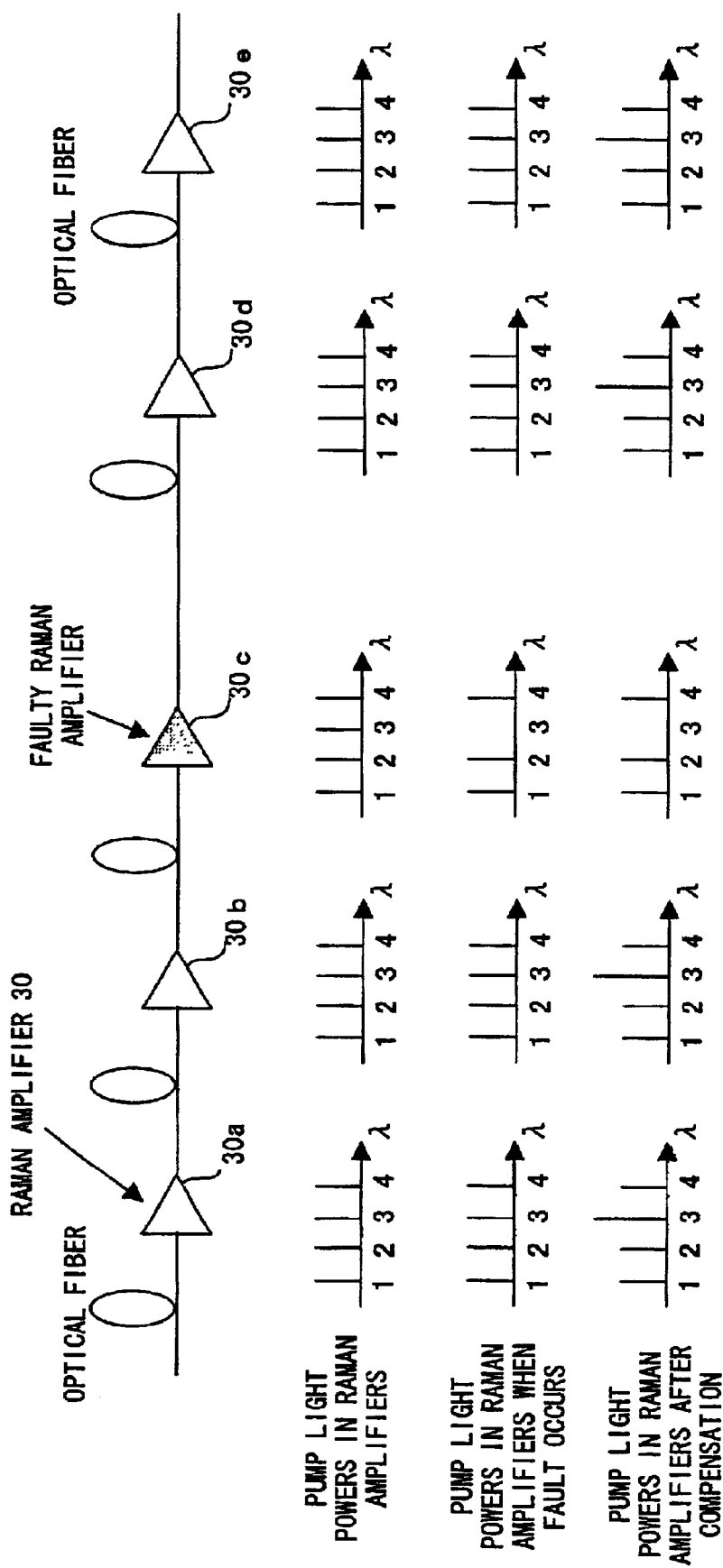
FIG. 20 explains the operations performed when a fault occurs in a pump light in the optical transmission system.

FIG. 20 shows the operations performed when a fault occurs in a pump light source in the transmission system. Here, assume that four pump lights having different wavelengths ($\lambda 1$ through $\lambda 4$) are provided in each of Raman amplifiers 30.

With the method shown in FIG. 20, if a fault occurs in an arbitrary pump light source within any of the Raman amplifiers, the power of the corresponding pump light source is adjusted in a different Raman amplifier in the neighborhood of the faulty Raman amplifier. As a result, the influence of the fault is compensated. In the example shown in FIG. 20, a pump light source producing a pump light $\lambda 3$ in a Raman amplifier 30c is faulty. In this case, the power of the pump light source producing the pump light $\lambda 3$ is raised in Raman amplifiers 30a, 30b, 30d, and 30e. Consequently, again deviation caused by the fault in the pump light source is reduced. This method is effective in the case where the wavelength spacing of the pump lights ($\lambda 1$ through $\lambda 4$) is relatively wide. Additionally, this method does not require an excessive redundant configuration.

If the number of Raman amplifiers where the power of a pump light is to be raised is small (the 4 Raman amplifiers 30a, 30b, 30d, and 30e in FIG. 20), a load on a particular pump light source becomes heavy, and this light source quickly deteriorates. In the meantime, if the number of Raman amplifiers where the power of a pump light is to be raised is large, an optical signal-to-noise ratio in the entire transmission system significantly deteriorates. Accordingly, the number of Raman amplifiers where the power of a pump light is to be raised must be suitably determined. For example, the number of Raman amplifiers may be "3".

The above described method is implemented by monitoring the state of each pump light source in the terminal station 10 or 20, and by issuing an instruction to a corresponding Raman amplifier upon detection of a fault.

Figure 21:
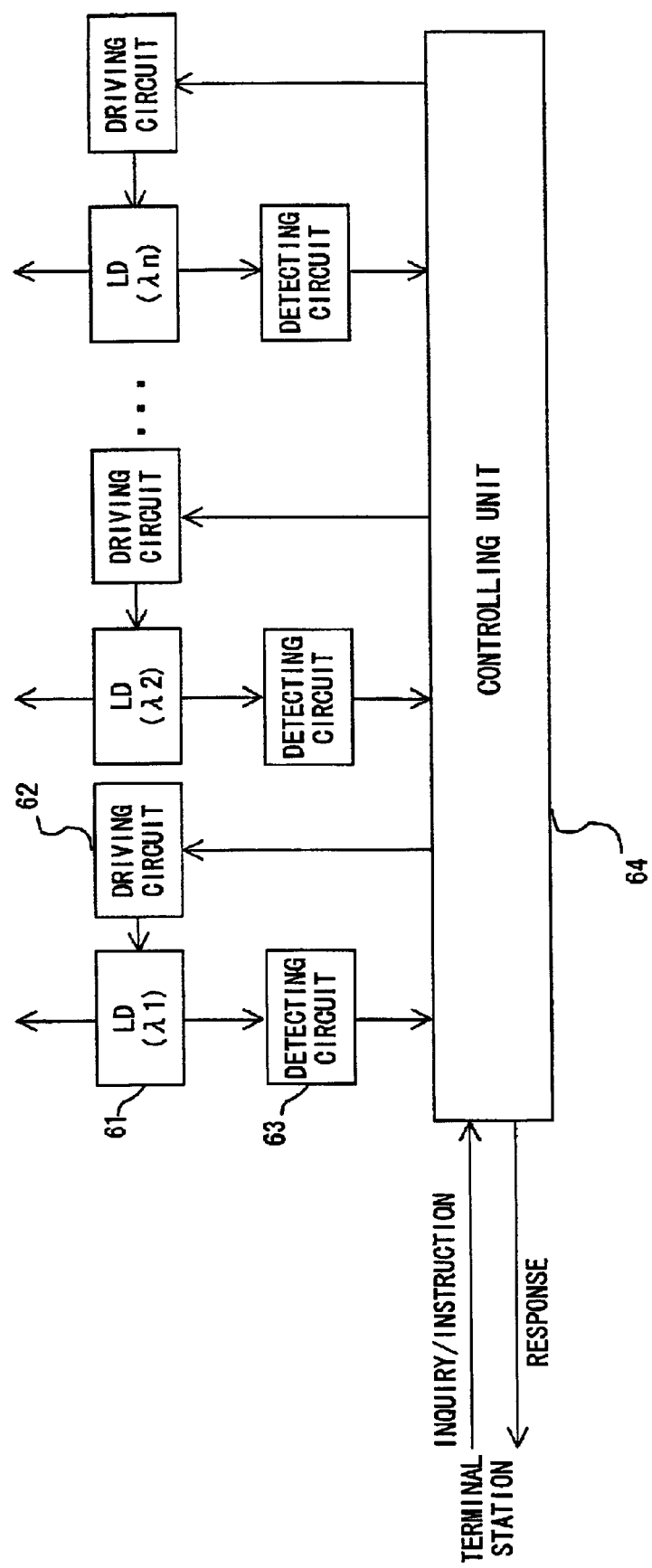
FIG. 21 explains the capability for adjusting the power of a pump light in a Raman amplifier.

FIG. 21 explains the capability for adjusting the power of a pump light in each Raman amplifier 30. Here, the Raman amplifier 30 comprises a plurality of pump light sources 61. Each of the pump light sources 61 is driven by a corresponding driving circuit 62. Here, the pump light source 61 is a laser diode. Additionally, the driving circuit 62 supplies an electric current instructed by a controlling unit 64 to a corresponding pump light source 61. A detecting circuit 63 detects the light emission power of a corresponding pump light source 61. The light emission power is detected, for example, based on the back power of a laser diode.

The controlling unit 64 checks the state of each of the pump light sources 61 in accordance with an inquiry from the terminal station 10 or 20. Specifically, the light emission power of the pump light source 61 is monitored based on the output of the detecting circuit 63. At this time, the value of the current supplied to the pump light source 61 may be examined. Then, the controlling unit 64 notifies the terminal station 10 or 20 of a detection result. Furthermore, the controlling unit 64 controls the driving circuit 62 in accordance with an instruction from the terminal station 10 or 20. In this way, the light emission power of a particular pump light source 61 is adjusted in accordance with the instruction from the terminal station 10 or 20.

Figure 22:
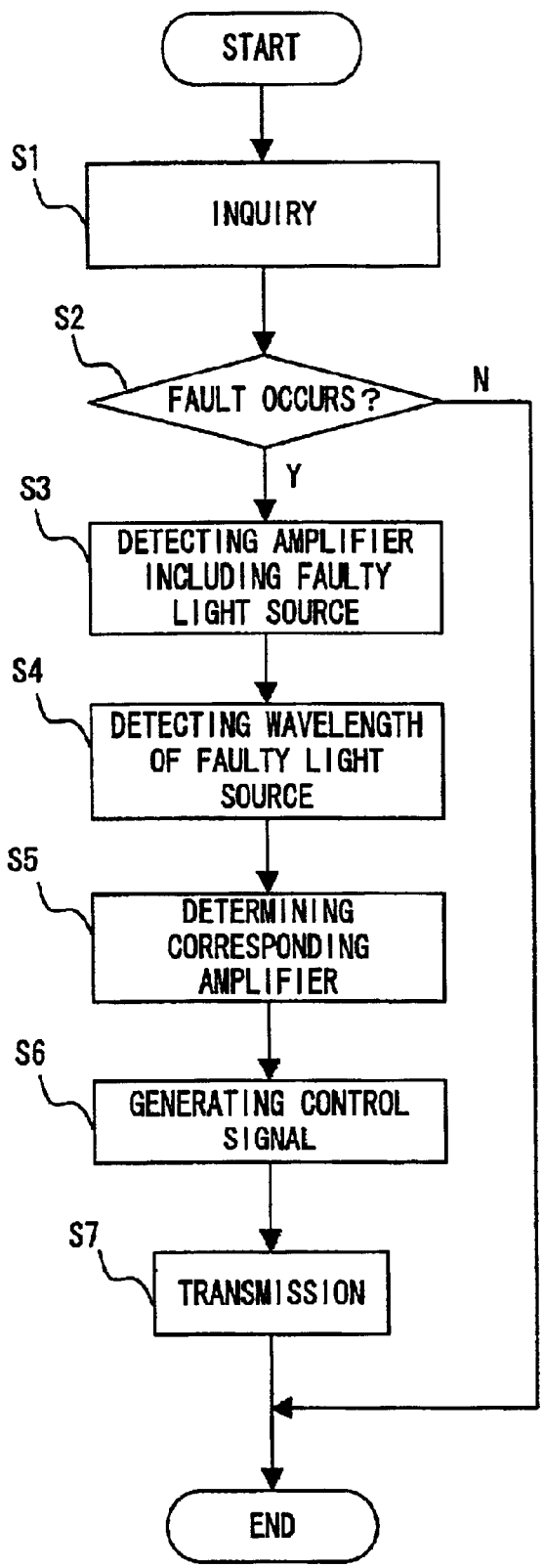
FIG. 22 is a flowchart showing the operation of a terminal station, which is intended to implement the capability shown in FIG. 20.

FIG. 22 is a flowchart showing the operations of the terminal station 10 or 20, which are intended to implement the capability shown in FIG. 20. The process of this flowchart is executed, for example, at predetermined time intervals.

In step S1, an inquiry about the state of each pump light source is made to each Raman amplifier 30. At this time, each Raman amplifier 30 checks the state of each pump light source in accordance with the inquiry, and returns the result. Note that a fault in a pump light source is detected, for example, if light emission power is lower than a predetermined level. In step S2, the response from each Raman amplifier 30 is received, and whether or not a faulty pump light source exists is checked. If a faulty pump light source exists, operations in and after step S3 are executed. Otherwise, the process is terminated.

In step S3, a Raman amplifier in which the faulty pump light source is arranged is identified. In step S4, the wavelength of the faulty pump light source is identified. In step S5, the Raman amplifier where the power of a pump light is to be adjusted is determined based on the result of step S3. In step S6, a control signal is generated. This control signal includes an instruction to raise the power of the pump light having the wavelength identified in step S4 for the Raman amplifier determined in step S5. At this time, suppose that a loss of "L (dB)" is caused by the fault in the pump light source, and a number of Raman amplifier which is instructed to increase the power of a pump light is "a". In this case, the value equivalent to "L/a (dB)" in terms of a gain is instructed as the amount of increase in the power of the pump light for the "a" Raman amplifiers. Then, in step S7, the control signal is transmitted. At this time, the Raman amplifier 30 adjusts the power of the corresponding pump light in accordance with the control signal.

Figure 23:
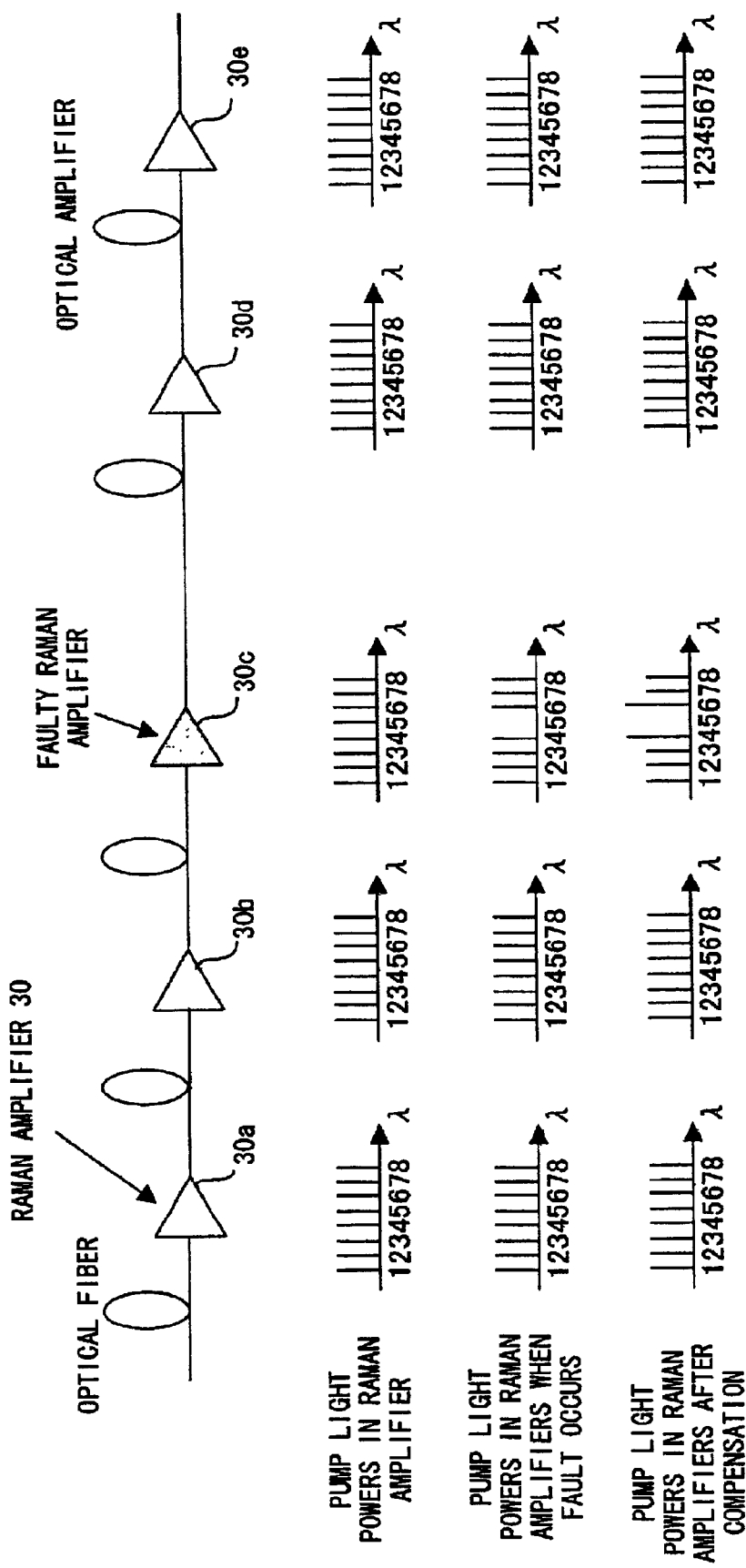
FIG. 23 explains other operations performed when a fault occurs in a pump light source.

FIG. 23 explains other operations when a fault occurs in a pump light source in the transmission system according to an embodiment. Here, assume that 8 pump lights ($\lambda 1$ through $\lambda 8$) having different wavelengths are provided in each Raman amplifier 30.

With the method shown in FIG. 23, if a fault occurs in an arbitrary pump light source within any of the Raman amplifiers, the influence of the fault is compensated by adjusting the power of a pump light having a wavelength adjacent to the wavelength of the pump light source in which the fault occurs in the Raman amplifier. In the example shown in FIG. 23, a pump light source producing the pump light $\lambda 5$ is faulty in a Raman amplifier 30c. In this case, the output powers of the pump lights $\lambda 4$ and $\lambda 6$ are raised in the Raman amplifier 30c. As a result, a gain deviation caused by the fault in the pump light source is reduced. Note that this method is effective in the case where the wavelength spacing of the pump lights ($\lambda 1$ through $\lambda 8$) is narrow. In the embodiment shown in FIG. 23, the optical powers of other pump light sources within the Raman amplifier 30c are adjusted when a fault occurs in a certain pump light source within the Raman amplifier 30c. However, the power of a pump light in other Raman amplifiers may be adjusted. For example, the output powers of the pump lights $\lambda 4$ and $\lambda 6$ may be raised in the Raman amplifiers 30b and 30d.

The above described method is implemented by monitoring the state of each pump light source in the terminal station 10 or 20, and by issuing an instruction to a Raman amplifier in which a fault occurs upon detection of the fault.

Figure 24:
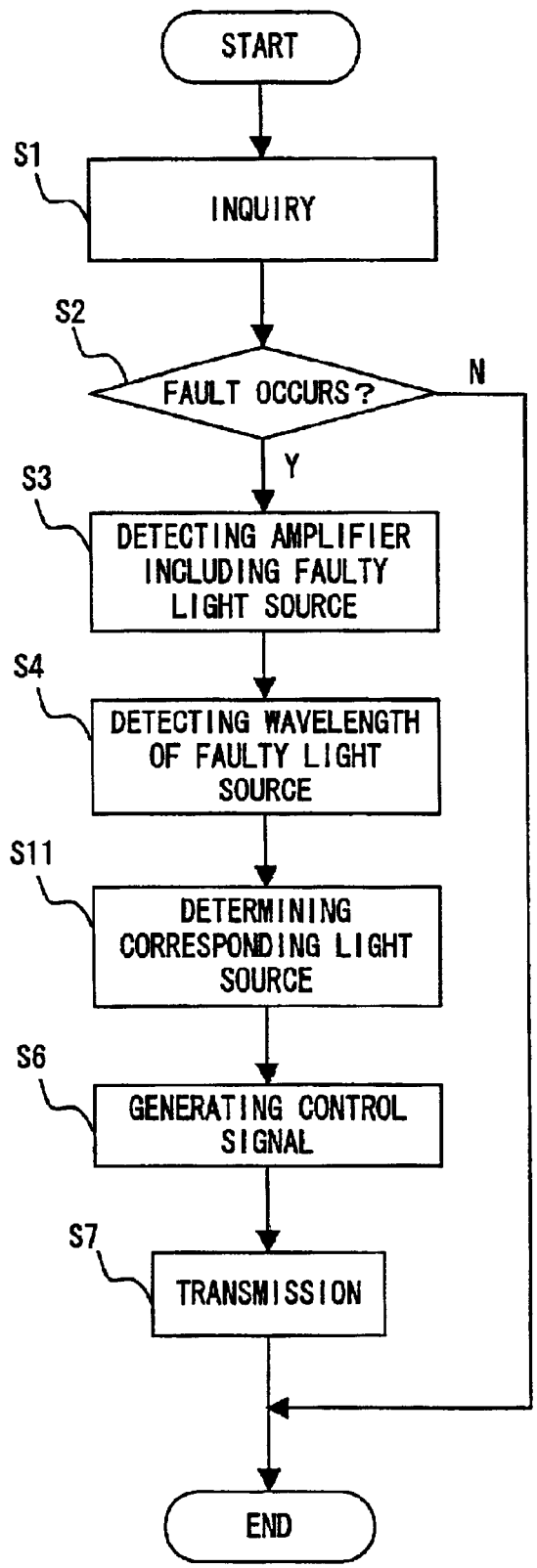
FIG. 24 is a flowchart showing the operation of a terminal station, which is intended to implement the capability shown in FIG. 23.

FIG. 24 is a flowchart showing the operations performed by the terminal station 10 or 20, which are intended to implement the capability shown in FIG. 23. Steps S1 through S4 are the same as those in the flowchart shown in FIG. 22. Namely, the terminal station 10 or 20 identifies a Raman amplifier or a pump light source in which a fault occurs.

In step S11, a pump light source in which the power of a pump light is to be adjusted is determined based on detection results of steps S3 and S4. Specifically, the pump light source producing the pump light having a wavelength adjacent to the wavelength of the pump light produced by the faulty pump light source is identified. Here, assume that the number of pump light sources whose output powers are to be adjusted is predetermined. If the number of pump light sources whose output powers are to be raised is too small, loads on the pump light sources become heavy. In the meantime, if the number of pump light sources whose output powers are to be raised is too large, it becomes difficult to flatten the gains. Accordingly, the number of pump light sources whose output powers are to be raised are determined in consideration of these factors.

Then, in step S6, a control signal is generated. This control signal includes an instruction to raise the power of a pump light produced by the pump light source identified in step S11 for the faulty Raman amplifier. At this time, also the amount of increase in the power of the pump light may be notified. In step S7, the control signal is transmitted. At this time, the Raman amplifier 30 that receives the control signal adjusts the power of the corresponding pump light in accordance with the control signal.

Figure 25:
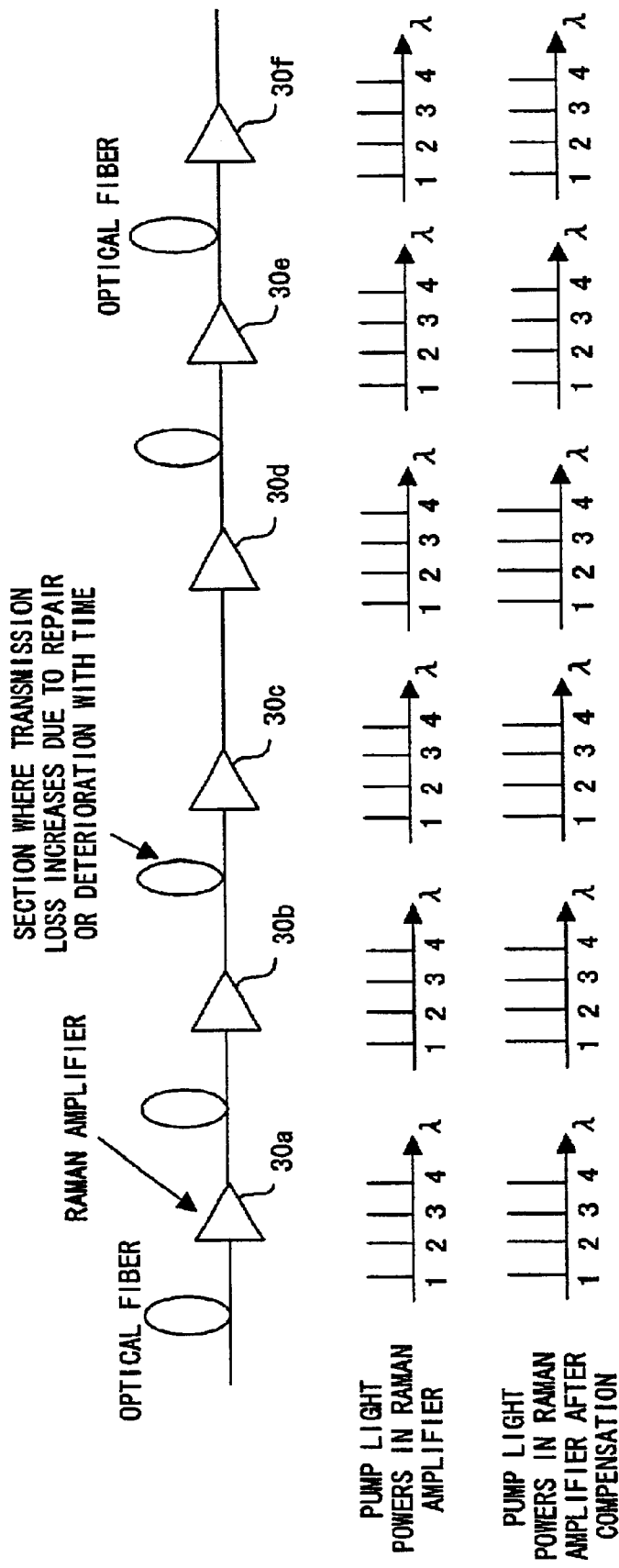
FIG. 25 explains further different operation when a fault occurs in a pump light source in the transmission system.

FIG. 25 explains still other operations performed when a fault occurs in a pump light source in the transmission system. Here, assume that four pump lights ($\lambda 1$ through $\lambda 4$) having different wavelengths are provided in each Raman amplifier 30.

With the method shown in FIG. 25, if the transmission loss of an arbitrary transmission section increases, it is compensated by adjusting the power of a pump light in a plurality of Raman amplifiers. In the example shown in FIG. 25, the transmission loss of the transmission line between the Raman amplifiers 30b and 30c increases. As a cause of an increase in the transmission loss, for example, repair work, deterioration with time, etc. of a transmission line are considered.

At this time, if the power of a pump light is raised only in a Raman amplifier that is connected directly to the transmission line whose transmission loss increases, a load on the pump light source becomes heavy. In addition, a gain deviation occurs due to variations in the characteristics of optical fibers or the splitting ratio of multiplexers. Accordingly, in this embodiment, the powers of pump lights are slightly raised in several Raman amplifiers before and after the transmission line whose transmission loss increases, thereby avoiding the above described problem. In the example shown in FIG. 25, the powers of pump lights within the Raman amplifiers 30a through 30d are slightly increased when the transmission loss of the transmission line between the Raman amplifiers 30b and 30c increases. Notice that the number of Raman amplifiers where the power of a pump light is to be raised is, for example, three. Furthermore, if a plurality of pump lights are used in each Raman amplifier for Raman amplification, the powers of all of the pump lights are raised.

With the above described method, a gain deviation is reduced in the entire system while preventing a load from concentrating on a particular pump light source. This method is implemented by issuing an instruction to a plurality of corresponding Raman amplifiers from the terminal station 10 or 20 when an increase in the transmission loss of a transmission line is recognized.

When a transmission line is repaired, an optical fiber thereon is normally replaced by another optical fiber. Here, each optical fiber has its intrinsic wavelength characteristic. Namely, if one optical fiber is replaced by another, also the gain of Raman amplification using that optical fiber changes. Hereinafter, a problems caused by this phenomenon is explained with reference to FIG. 26.

Figure 26:
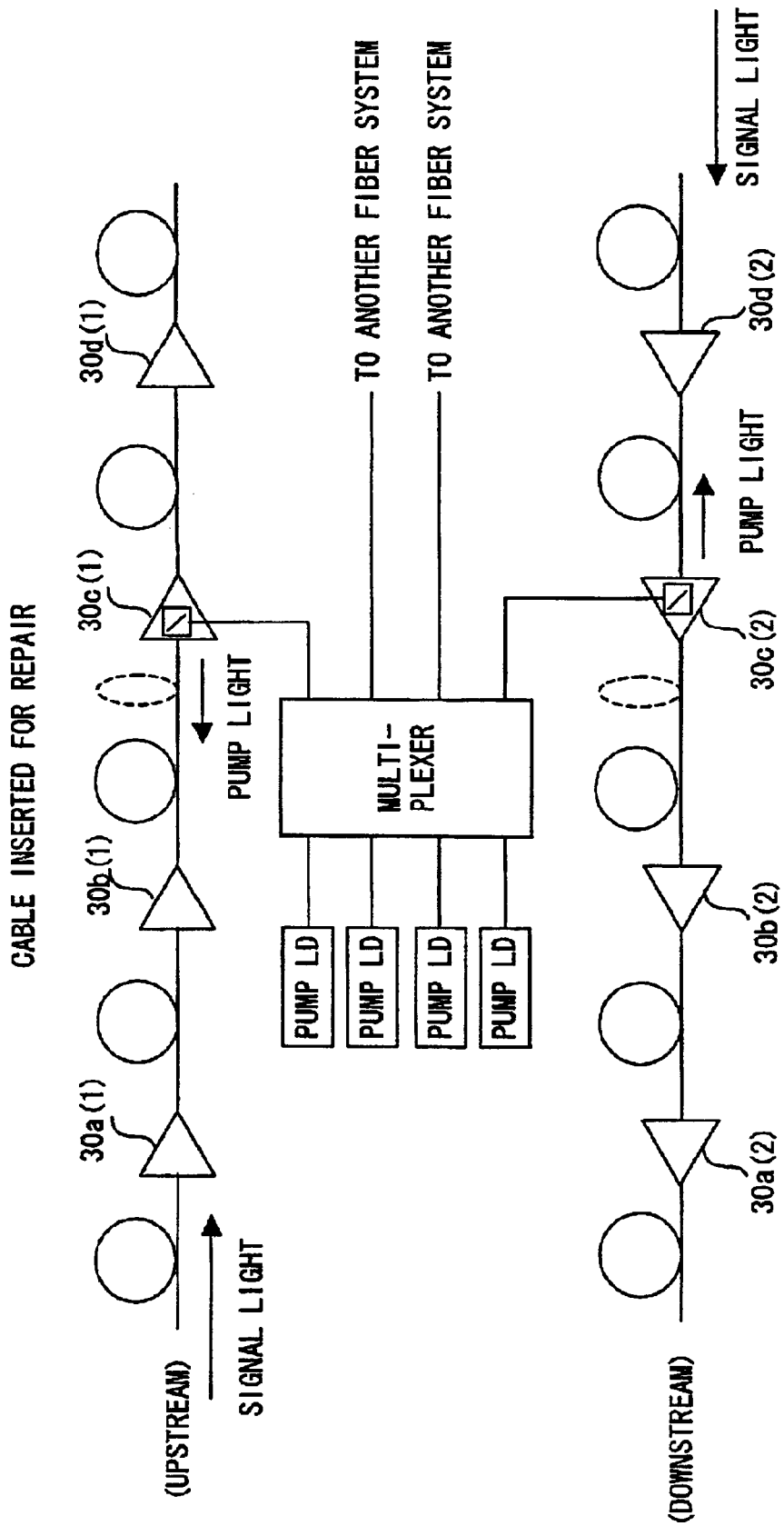
FIG. 26 exemplifies a method adjusting a pump light when a transmission line is repaired.

In the example shown in FIG. 26, Raman amplifiers 30a through 30d are spaced on a pair of transmission lines (upstream and downstream transmission lines). In this figure, a pump light source and a multiplexer are depicted only for the Raman amplifier 30c, but not for the other Raman amplifiers. Here, assume that a pump light is input to each optical fiber so that it is transmitted in a direction reverse to a signal light.

Also assume that the transmission line between the Raman amplifiers 30b and 30c has been repaired in the above described configuration. Under this situation, if the power of the pump light in the Raman amplifier 30c is adjusted, a Raman gain difference is caused between the upstream and the downstream transmission lines. That is to say, the pump light from the Raman amplifier 30c is provided for the transmission line between the Raman amplifier 30c and 30b in the downstream, while the pump light is provided for the transmission line between the Raman amplifier 30c and 30d in the downstream. Here, the transmission line between the Raman amplifier 30c and 30b has been replaced with new one. Therefore, if the pump light is adjusted in the Raman amplifier 30c, the adjusted pump light is provided for a newly arranged optical fiber on the upstream transmission line, but it is provided to the optical fiber used so far on the downstream transmission line. As a result, the gains of the upstream and the downstream transmission lines can possibly differ.

Accordingly, in a system of the following embodiment, the power of a pump light for Raman amplification may be adjusted on a transmission section other than a repaired transmission section, when a transmission loss due to a repair work of the transmission line is compensated. For example, if the transmission loss of the transmission line between the Raman amplifiers 30b and 30c increases in FIG. 25, the powers of the pump lights in the Raman amplifiers 30d through 30f may be slightly raised, respectively.

If a transmission loss increases by "L (dB)" due to a repair work of a transmission line, and a number of Raman amplifiers which are instructed to increase power of pump lights in order to compensate for the loss is "a", the amount of increase in the power of the pump light in each of the Raman amplifiers is equivalent to "L/a (dB)" in terms of a gain. That is, a load is equally distributed to the plurality of Raman amplifiers.

Explained next is a method building a transmission system in consideration of variations in the characteristic of the multiplexer 32 that multiplexes a plurality of pump lights.

If a plurality of pump lights are respectively provided to a plurality of optical fibers, for example, the multiplexer which is shown in FIG. 6 and configured by a plurality of 2-input/2-output 3-dB couplers is used. At this time, it is desirable that the multiplex and split ratio of this multiplexer is even. For instance, when a plurality of pump lights ($\lambda 1$ through $\lambda 4$) with the same power are input, it is desirable that four sets of multiplexed pump lights, each of which includes the plurality of pump light in an even ratio, are output from the output ports.

Actually, however, it is not easy to manufacture a 2-input/2-output 3-dB coupler having a split ratio that is exactly "1:1". Accordingly, if the multiplexer 32 is configured by combining many 2-input/2-output 3-dB couplers, a plurality of pump lights are multiplexed unevenly, for example, as shown in FIG. 27B. Here, a gain of Raman amplification depends on the power of a given pump light. Accordingly, if the pump lights ((λ1 through λ4) are multiplexed by the multiplexer 32 shown in FIG. 27B and provided to optical fibers, gains on the respective transmission lines do not become flat. By way of example, in the case shown in FIG. 27B, the gain of the wavelength band corresponding to the wavelength λ3 becomes large, whereas the gains of the wavelength bands corresponding to the wavelengths λ1 and λ4 become small on the optical fiber 1.

In this embodiment, a combination of multiplexers 32 arranged in Raman amplifiers 30 is optimized. To be more specific, the characteristics (especially split ratio) of many multiplexers 32 are measured beforehand. Then, several to several tens of multiplexers 32 are suitably selected so that an average of the characteristics becomes ideal as shown in FIG. 27A. The selected several to several tens of multiplexers 32 are put into one group, and used for Raman amplifiers that are successively spaced on a transmission line. In the example shown in FIG. 28, five multiplexers 32 are selected to make an average of the characteristics ideal, and used for the Raman amplifiers 30a through 30e. In this case, the wavelength characteristics of the gains obtained by the Raman amplifiers 30a through 30e are averaged on a transmission line from a node A to a node B. That is to say, a gain is obtained on the transmission line between the nodes A and B in the state where variations in the multiplexers 32 are compensated.

In the above described system, multiplexers 32 may be selected and installed every number of optical fibers accommodated by a multi-optical fiber cable, or every integer multiple of the number of optical fibers.

Additionally, an average of the characteristics of several to several tens of multiplexers 32 is made ideal in the above provided example. However, the present invention is not limited to this implementation. Namely, multiplexers may be suitably selected so that the average of the characteristics of multiplexers for all of Raman amplifiers 30 that are arranged on the transmission line between the terminal stations 10 and 20 becomes ideal. Considering the operation efficiency when a transmission line is configured, it is preferable that a selection is made in units of groups of several to several tens of multiplexers 32.

Furthermore, with the method shown in FIG. 20 or 25, the powers of pump lights in a plurality of Raman amplifiers are adjusted. In this case, pump lights in several Raman amplifiers that include multiplexers 32 having characteristics an average of which is ideal may be adjusted. For example, if multiplexers 32 of the Raman amplifiers 30a through 30e have been selected in such a way that an average of the characteristics of the multiplexers 32 is ideal, the powers of the pump lights in the Raman amplifiers 30a through 30e are slightly raised. With this configuration, pump lights are adjusted in a Raman amplifier group where multiplexers 32 are suitably selected and arranged. Therefore, a Raman gain deviation does not become large although the pump lights are adjusted.

According to the present invention, when a factor which changes a Raman gain arises in an optical transmission system where a plurality of Raman amplifiers are spaced on a transmission line, the gain is adjusted according to the factor. Therefore, the transmission characteristic of a signal is not deteriorated.

The power of a different pump light source is automatically adjusted to maintain a gain when a fault occurs in a pump light source, and the power of a particular pump light source is adjusted to maintain a gain when the transmission loss of an optical transmission line changes.

What is claimed is:

1. An optical transmission system, comprising:
a bi-directional transmission line including first and second optical transmission lines; and
a plurality of Raman amplifiers positioned on the bi-directional transmission line, each of the Raman amplifiers including an optical device to multiplex a plurality of pump lights to produce multiplexed light and to guide the multiplexed light to both of the first and second optical transmission lines to amplify optical signals on both of the first and second optical transmission lines so that when power of a first pump light, having a first wavelength, among the plurality of pump lights drops to at most a predetermined level in a first Raman amplifier among said plurality of Raman amplifiers, power of a second pump light having a second wavelength substantially equal to the first wavelength is raised in both a second Raman amplifier located next to the first Raman amplifier on a first side and a third Raman amplifier located next to the first Raman amplifier on a second side.

2. An optical transmission system, comprising:
a bi-directional transmission line including a first and second optical transmission lines; and
a plurality of Raman amplifiers positioned on the bi-directional transmission line, each of the Raman amplifiers including an optical device to multiplex a plurality of pump lights to produce multiplexed light and to guide the multiplexed light to both of the first and second optical transmission lines to amplify optical signals on both of the first and second optical transmission lines so that when power of a first pump light, having a first wavelength, among the plurality of pump lights drops to at most a predetermined level in a first Raman amplifier among said plurality of Raman amplifiers, power of a second pump light having a wavelength adjacent to the first wavelength is raised in both a second Raman amplifier located next to the first Raman amplifier on a first side and a third Raman amplifier located next to the first Raman amplifier on a second side.

3. The optical transmission system according to claim 1, wherein each optical transmission line accommodates "m" optical fibers, and
wherein each of said Raman amplifiers includes a multiplexer multiplexing "m" pump lights having different wavelengths to provide a multiplexed pump light to each of the "m" optical fibers.

4. The optical transmission system according to claim 1, wherein each optical transmission line accommodates "m" optical fibers, and
wherein each of the Raman amplifiers comprises a multiplexer having "m" input ports and "m" output ports, each of the "m" input ports receiving a polarization-coupled light, obtained by polarization-coupling two pump lights, the multiplexer multiplexes the polarization-coupled lights input via the "m" input ports, and providing a multiplexed light to the "m" optical fibers.

5. The optical transmission system according to claim 1, wherein each of the Raman amplifiers comprises a multiplexer multiplexing a plurality of pump lights, and providing a multiplexed pump light to said optical transmission line, and
wherein said optical transmission system uses a plurality of multiplexers selected and arranged so that an average of at least one characteristic of the multiplexers in a predetermined number of Raman amplifiers has a predetermined value in each group of the predetermined number of Raman amplifiers and the power of the pump lights is raised in the predetermined number of Raman amplifiers.

6. An optical transmission method with which a plurality of Raman amplifiers are positioned on a bi-directional optical transmission line between a first optical terminal station and a second optical terminal station, each of the Raman amplifiers using a plurality of pump lights, comprising:

obtaining information regarding power of each of the pump lights in the Raman amplifiers at the first optical terminal station;

transmitting, when power of a first pump light, having a first wavelength, among the pump lights drops to at most a predetermined level in a first Raman amplifier among the Raman amplifiers, a control signal for raising power of a second pump light having a second wavelength substantially equal to the first wavelength, from the first optical terminal station to at least one of the Raman amplifiers on each side of the first Raman amplifier;

adjusting the second pump light in accordance with the control signal in the at least one of the Raman amplifiers on each side of the first Raman amplifier;

multiplexing the pump lights to produce multiplexed light; and guiding the multiplexed light to both of the first and second optical transmission lines.

7. The optical transmission system according to claim 1, wherein each of said Raman amplifiers includes:

a pair of variable attenuators attenuating the multiplexed light to be guided to both of the first and second optical transmission lines;

a pair of detectors detecting optical powers of the optical signals on both of the first and second optical transmission lines; and a controller controlling the pair of variable attenuators based on the optical powers detected by said pair of detectors.

* * * * *